United States Patent Office 3,402,461
Patented Sept. 24, 1968

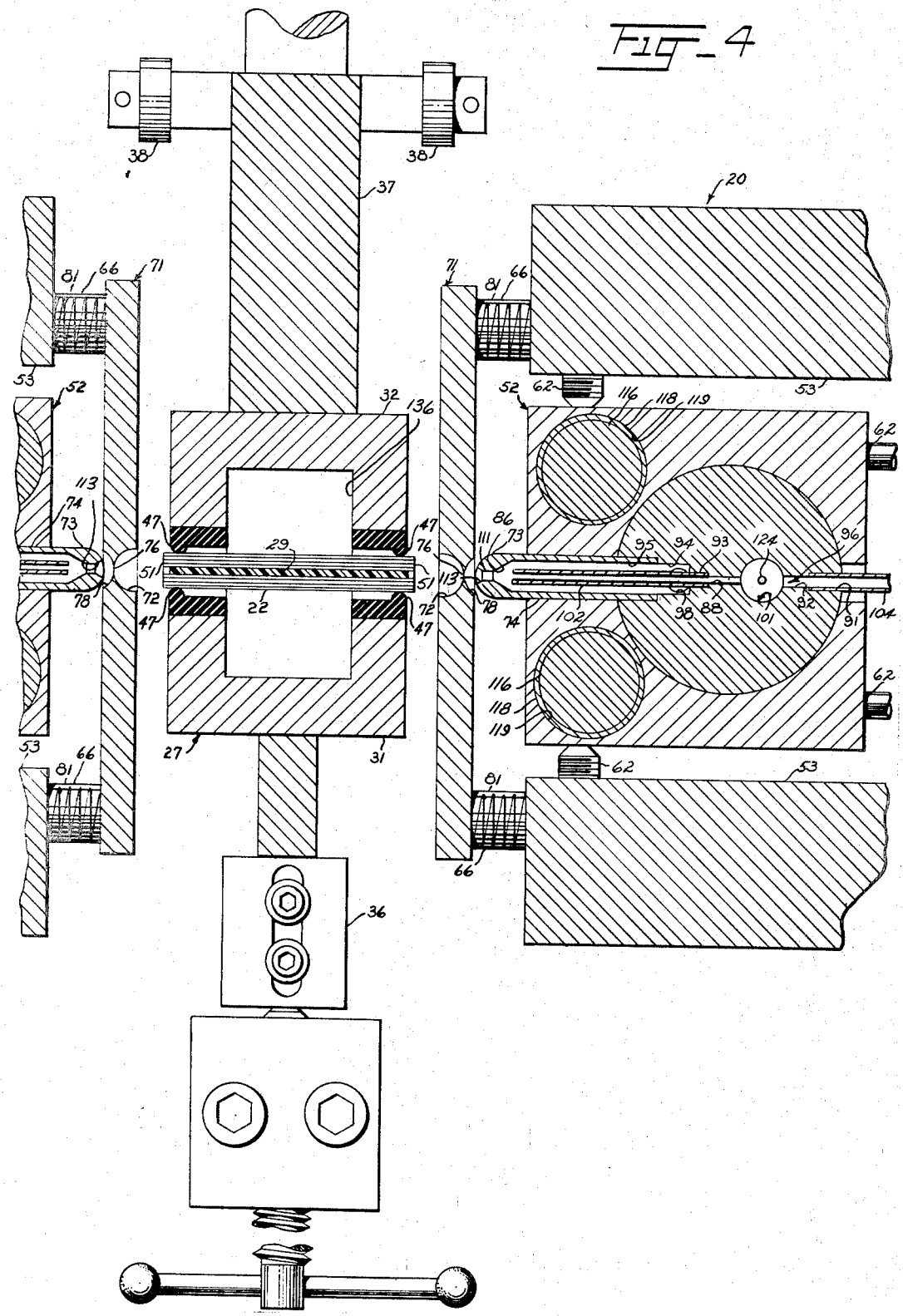

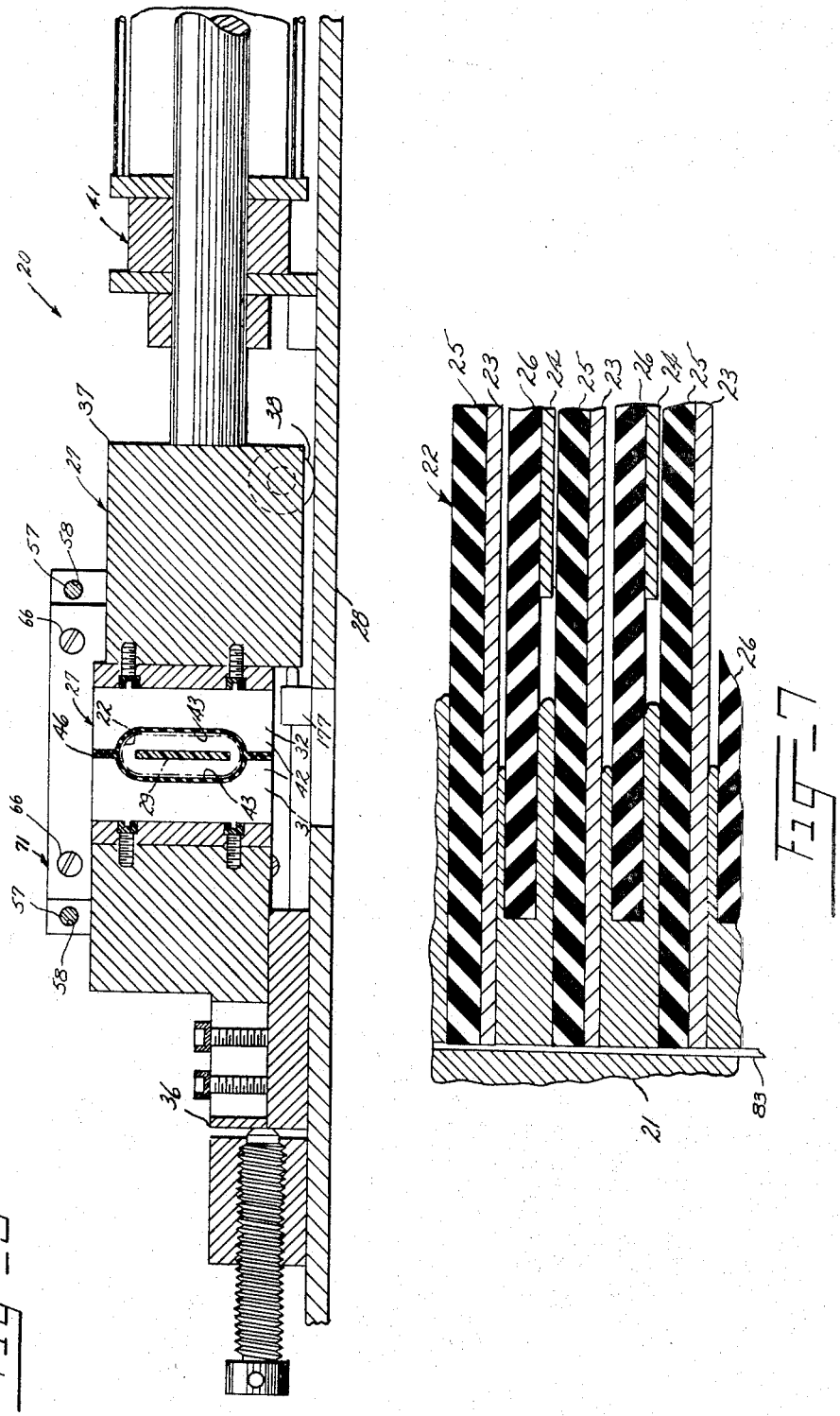

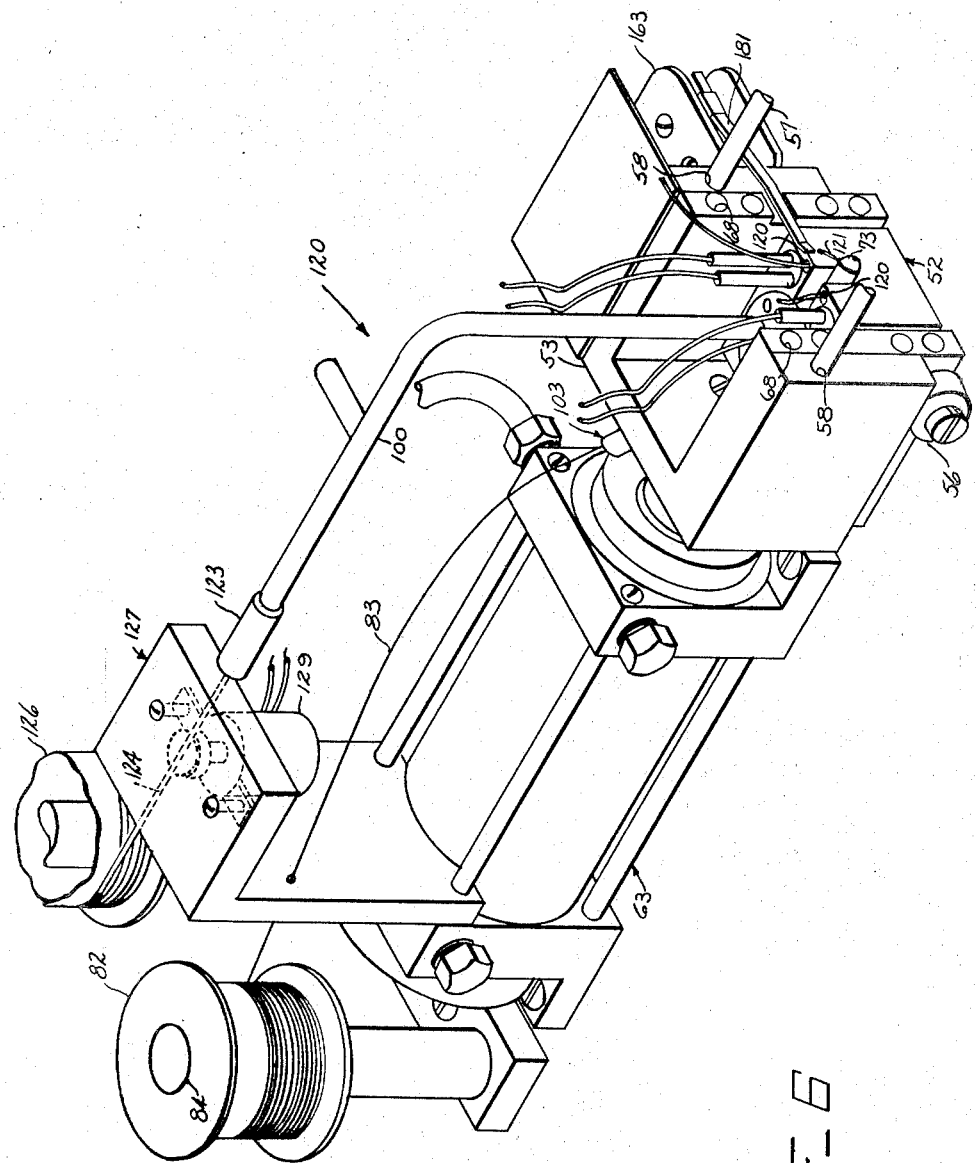

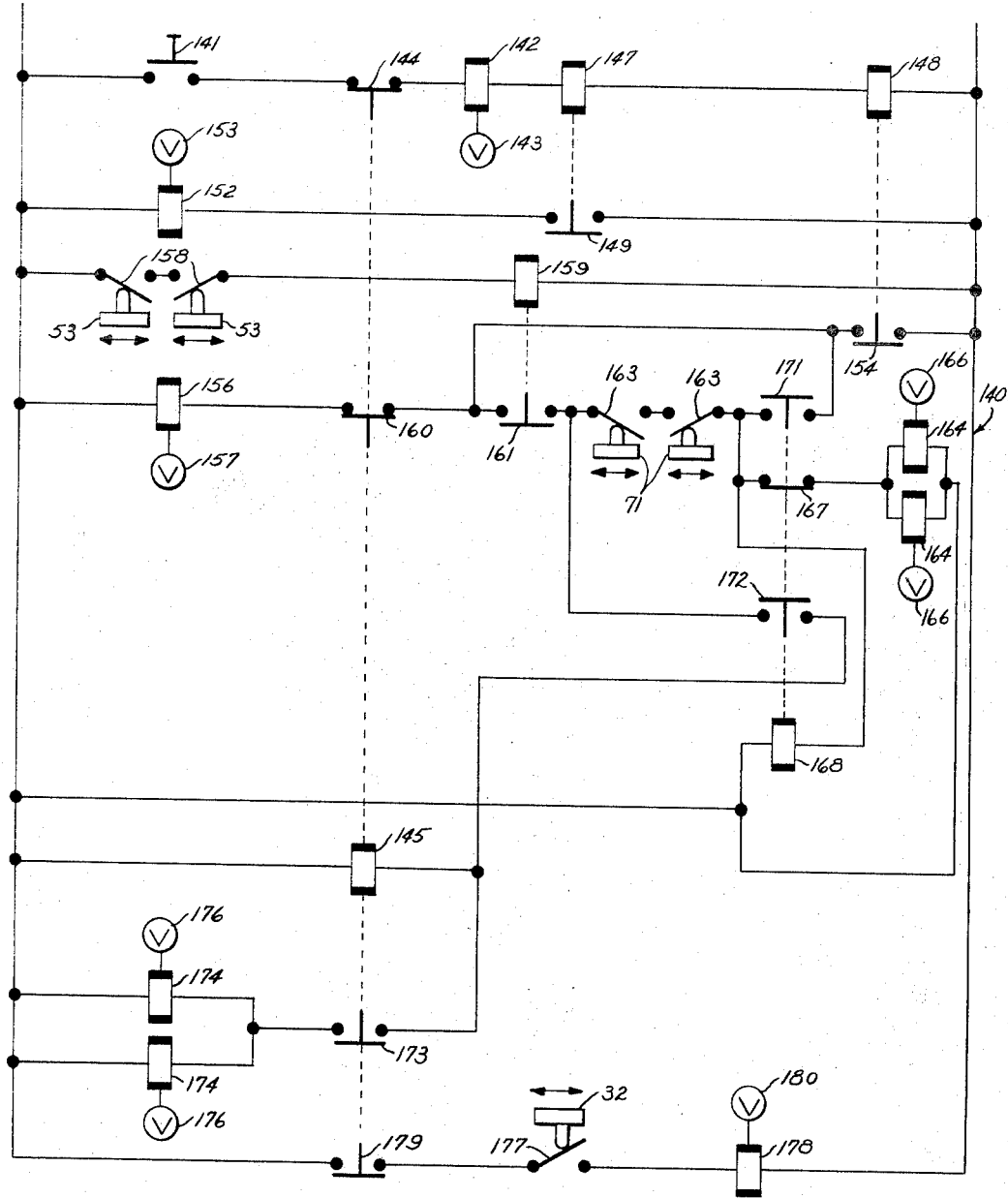
Fig_8

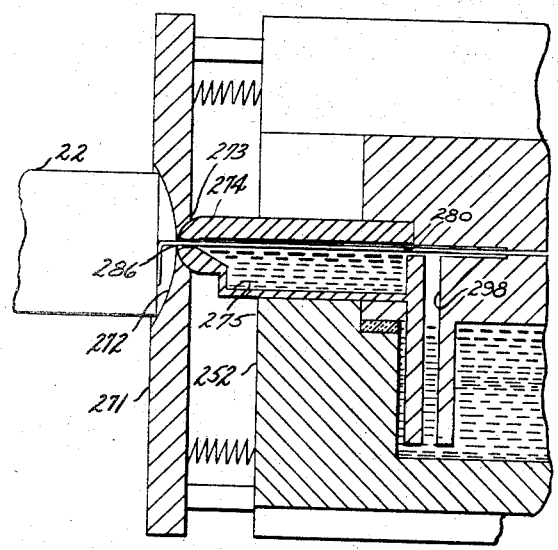
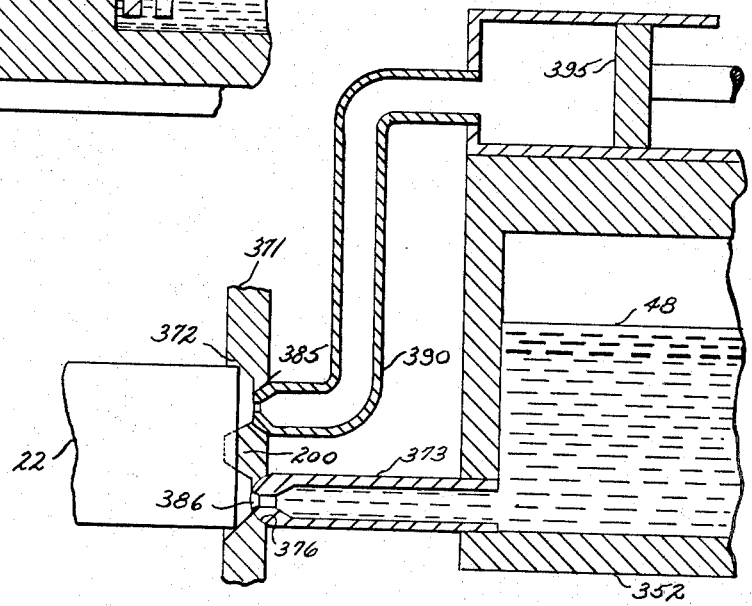
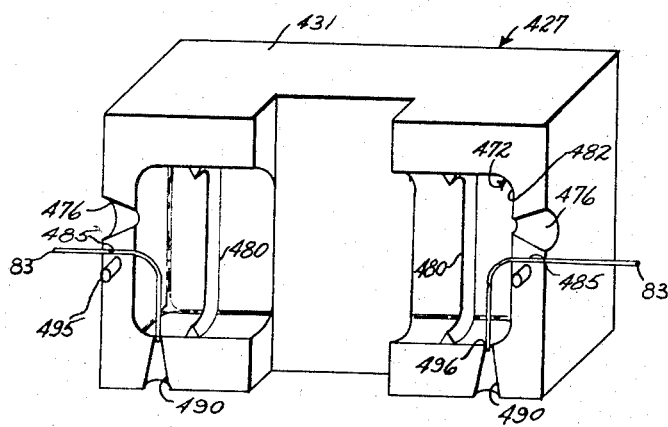

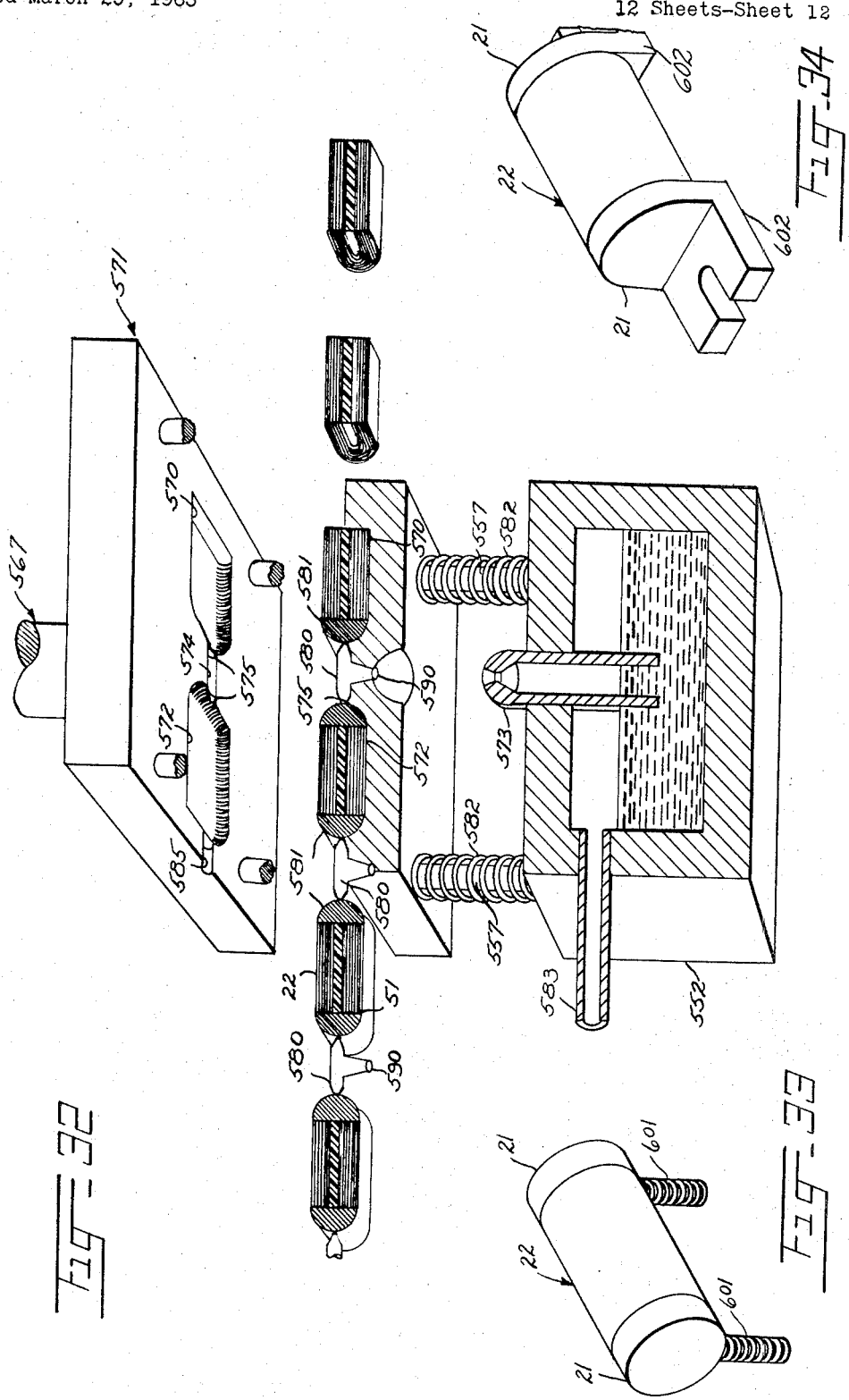

3,402,461
CAPACITOR TERMINATION
Robert H. Cushman, Princeton Junction, and James A. Hosford, Rocky Hill, N.J., assignors to Western Electric Company, Incorporated, New York, N.Y., a corporation of New York
Filed Mar. 25, 1963, Ser. No. 267,471
19 Claims. (Cl. 29—592)

ABSTRACT OF THE DISCLOSURE

Capacitors formed of interleaved layers of conductive and dielectric materials are terminated by forcing or extruding molten solder into the interstitial spaces between the interleaved layers of conductive and dielectric materials. The depth of penetration of the extruded molten solder into the interstitial spaces is controlled to prevent capacitor shorting, and the extruded molten solder is rapidly cooled to prevent thermal degradation of the capacitor materials.

---

The present invention relates to pressure molding processes and apparatus and to articles produced by pressure molding techniques. More particularly, although not exclusively, the invention relates to electrical capacitors and methods of and apparatus for forming electrical terminations on capacitors formed of interleaved layers of conductive and dielectric materials.

In the past it has been customary to secure electrical leads to conductive plates of wound foil capacitors formed of interleaved layers of conductive and dielectric materials by inserting the leads, during a winding operation, between the layers of the dielectric material and metal foil which form plates of the capacitor. It is also common to spray solder on the ends of metalized film capacitors after the capacitors have been wound, or to secure the leads to the capacitors by holding preformed leads against the ends of the capacitors by an encapsulating process. These different ways of forming electrical terminations on the ends of capacitors or securing leads to the ends of the capacitors are often impractical because they complicate the winding operation, provide passages into which moisture may enter the capacitor and provide relatively high electrical inductance and electrical resistance connections which may be mechanically weak and relatively expensive to make.

It is desirable to produce clean, electrical terminations which are hermetically sealed, uniform in dimensions and appearances and yet improve the electrical properties and reliability of the termination. It is also desirable to produce a termination having a maximum number of connections with the relatively long edge of a layer of metallic material, which forms one conductive plate of the capacitor, so that the electrical resistance of the over-all connection is a minimum.

The present invention embodies extremely flexible methods for applying solder ends or terminations to relatively low temperature components at relatively rapid rates to produce consistently strong mechanical and low resistance electrical terminations. Lead wires can be secured to the terminations simultaneously with the forming of the termination to reduce the number of manufacturing steps required to produce finished components to a minimum and facilitate close positional control of leads required for automatic handling of the components.

It has been found that when molten solder is forced rapidly against the open end of the wound capacitor with sufficient speed and force, the molten solder will be forced into the interstitial spaces between the layers of tape achieving a mechanically clamped termination (i.e., the solder is clamped between the layers of the dielectric material instead of just being stuck to the ends of the unit). By the use of restricting molds, the molten solder can be caused to conform closely to the physical dimensions of the capacitor to achieve a mechanical strong and good electrical connection with the thin layers of metal or metalized dielectric used as conductive plates of the capacitor. Accordingly, the present invention can be used to form a relatively low resistance electrical connection between the end of the wound capacitor and a relatively accurately positioned electrical lead.

In accordance with the present invention, a predetermined mass of a suitable solder material, in a molten state, is brought into close proximity with the end of the capacitor. The molten solder is forced immediately and rapidly against the end of the capacitor to extrude or express the molten solder into the interstitial spaces between the interleaved layers of the conductive and nonconductive materials in the end of the capacitor. If the cooling rate of the molten solder is controlled carefully during the molding operation, the molding process can be accomplished with little or no burning or charring of the dielectric material of the capacitor, even though the temperature of the molten solder may be of the order of 300° F. above the melting temperature of the dielectric material.

The extrusion of the molten solder into the end of the capacitor may be accomplished by confining the molten solder in a rigid mold or a mold made of flexible metal or of a relatively high melting point plastic and causing relative movement between the mold and the end of the capacitor surrounded by the mold. The molten solder can be expressed into the mold through a nozzle by using a mechanical plunger or air pressure on a bath of the molten solder contained in an adjacent chamber. Alternatively, a hypodermic needle may be utilized as a nozzle to extrude the molten solder into the end of the capacitor. A vacuum may be used to pull or draw the molten solder into the mold cavity and in intimate contact with the end of the capacitor. In certain applications it is desirable to provide a predetermined amount of molten solder in an open mold cavity of a predetermined shape with a terminal projecting upwardly from a depression or aperture in the bottom of the mold and to force the end of the capacitor into the mold cavity to express the molten solder into the interstitial space between the layers of conductive and dielectric material of the capacitor.

In order to utilize methods embodying the present invention most advantageously, accurate control of the many parameters involved should be maintained. These parameters include the composition of the solder or metal alloy; the volume of solder; the casting temperature of the solder; the temperature of the nozzle; the size and material of the nozzle; the size of the orifice of the nozzle; the magnitude, duration and rate of change of the air pressure applied to the solder; the length and diameter of the supply tube; the shape, thickness, material, temperature and heat transfer rate of the mold; the injection and cooling time cycle. Since these parameters are controlled and varied relatively easily, the invention is advantageous for automatic mass production of various electrical components.

It is an object of the present invention to provide new and improved methods of and apparatus for pressure molding solder materials and articles produced thereby.

It is an object of the present invention to provide new and improved methods of and apparatus for applying molten material around or against parts having a relatively low melting point, such as electrical components, without damaging the components.

It is the further object of the present invention to express molten material having a relatively high melting point into interstices or apertures in material having a relatively low melting point without causing degradation of the low melting point material.

It is another object of the present invention to provide new and improved electrical capacitors and methods of and apparatus for forming electrical terminations on the ends of capacitors formed of interleaved layers of conductive and nonconductive materials.

It is a still further object of the present invention to provide new and improved methods of and apparatus for securing electrical leads to wound electrical capacitors by expressing molten material into interstitial spaces in the ends of the capacitors.

A method of forming an improved electrical termination on the end of a capacitor formed of interleaved layers of conductive and dielectric materials, which embodies certain features of the present invention, may include the steps of supporting a mass of molten solder adjacent to the end of the capacitor, extruding a portion of the mass of molten solder into interstitial spaces in the end of the capacitor between the interleaved layers of conductive and dielectric materials, and rapidly cooling at least a portion of the molten solder while simultaneously confining the portion remaining exteriorly of the capacitor to form an electrical termination projecting from the end thereof.

Apparatus for forming an electrical termination on the end of an electrical capacitor formed of interleaved layers of conductive and dielectric materials, which embodies certain features of the present invention may include means for supporting the capacitor, a supply of solder, and means for heating at least a portion of the solder to a molten state. Means are provided for applying pressure to the molten solder to express the molten solder into the interstitial spaces between the interleaved layers of conductive and dielectric materials of the capacitor adjacent to the end thereof.

An electrostatic capacitor embodying certain features of the present invention may include, a body portion formed of dielectric material, and at least two electrically conductive plates. The conductive plates are insulated electrically from each other by the dielectric material. An edge of at least one of the conductive plates extends axially of the capacitor outwardly with respect to the edge of at least one other conductive plate on each end of the body portion of the capacitor. A mass of electrically conductive material is provided on each end of the body portion and has extruded projecting portions thereof extending into interstitial spaces formed between the conductive plates and the dielectric material inwardly a substantial distance of the outermost edge of at least one of the layers of conductive material on the corresponding end of the body portion but outwardly of the adjacent edge of the layer of conductive material extending beyond the other layer of conductive material on the opposite end of the body of the capacitor.

Other objects and features of the present invention will be more readily understood from the following detailed description of specific embodiments thereof when read in conjunction with the accompanying drawings in which:

FIG. 4 is a fragmentary, enlarged, horizontal, sectional view of the apparatus of FIG. 3 taken along line 4—4 thereof;

FIG. 5 is an enlarged, vertical, sectional view of the apparatus of FIG. 2 taken along line 5—5 thereof;

FIG. 6 is an enlarged perspective view of a portion of the apparatus of FIG. 1 with portions broken away for purposes of clarity;

FIG. 7 is an enlarged section view of a capacitor terminated by the apparatus illustrated in FIGS. 1 to 6, inclusive;

FIG. 8 illustrates a control circuit for the preferred embodiment of the apparatus;

Figure 1:
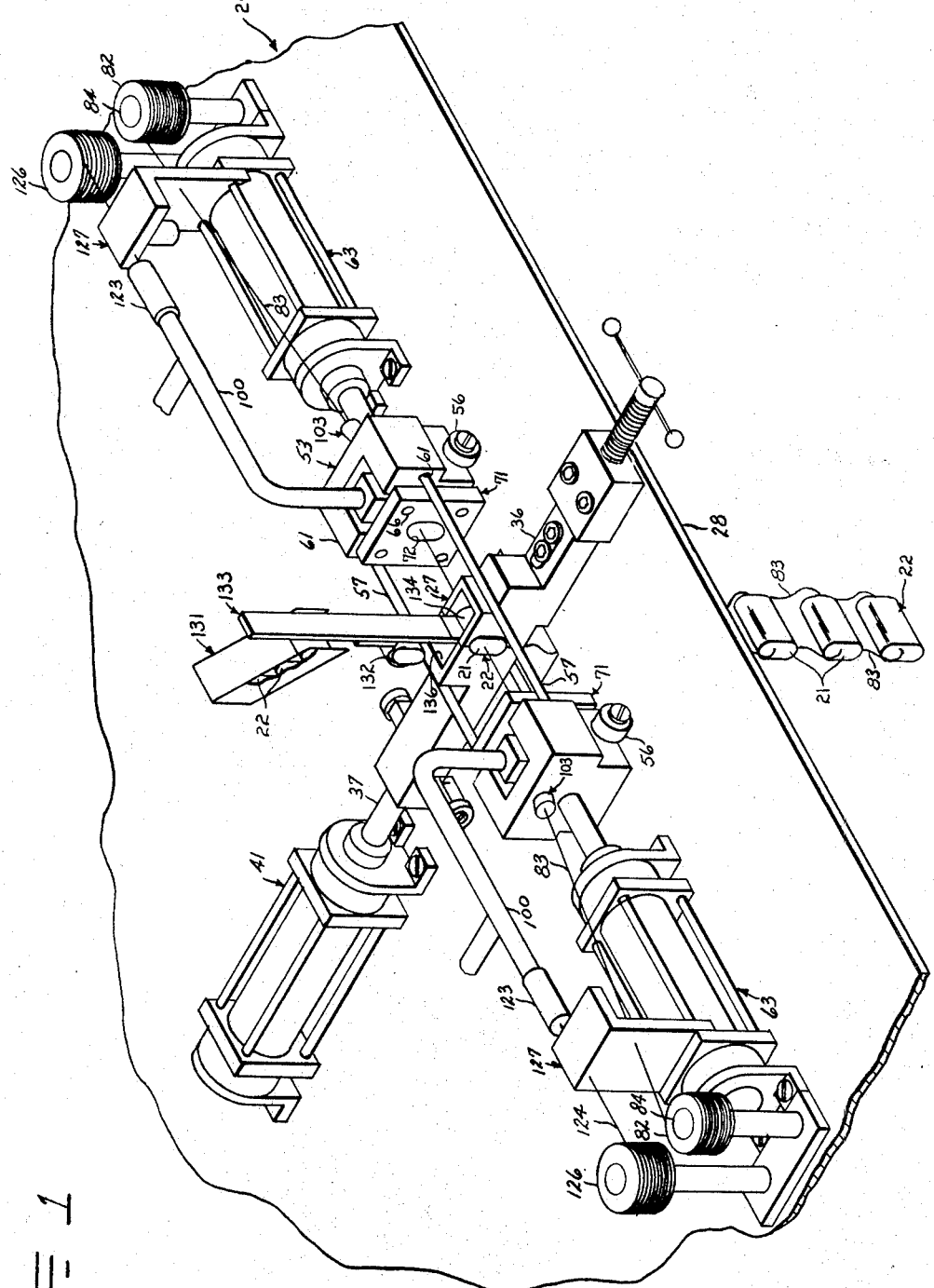
FIG. 1 is a pictorial view of a preferred embodiment of the capacitor-terminating apparatus illustrating certain features of the present invention.
Figure 2:
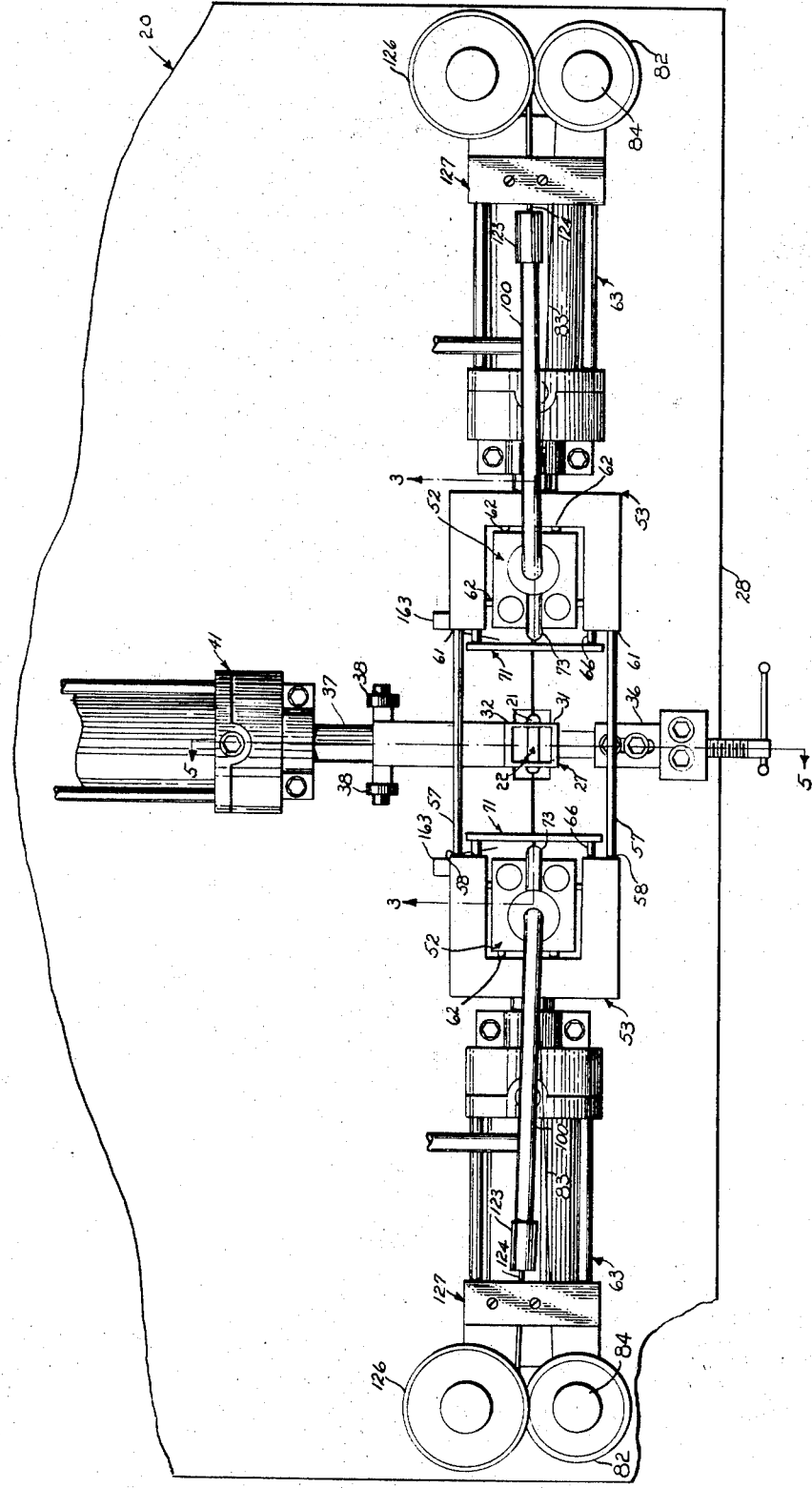
FIG. 2 is a plan view of the capacitor-terminating apparatus illustrated in FIG. 1.

FIGS. 13 to 17, inclusive, illustrate various types of capacitor terminations embodying certain principles of the present invention;

FIGS. 18 to 28, inclusive, illustrate various types of molds for terminating the types of capacitors illustrated on FIGS. 13 to 17, inclusive;

FIGS. 29 to 32, inclusive, illustrate apparatus forming alternative embodiments of the invention; and FIGS. 33 and 34 illustrate alternative embodiments of the terminated capacitors.

Referring now to the drawings and more particularly to FIGS. 1 to 6, inclusive, thereof, there is shown a preferred embodiment of apparatus, designated generally by the numeral 20, for placing electrical terminations 21—21 on electrostatic capacitors, designated generally by the numerals 22—22. The capacitors 22—22 may be any of many well-known types, but are herein illustrated (FIG. 7) as ones having two conductive plates formed of two thin layers of suitable metal 23 and 24, such as zinc or aluminum, formed on suitable dielectric tapes 25 and 26, such as Mylar, paper or styrene tapes. The layers of metal 23 and 24 are of equal widths and are wound spirally around each other and around a mandrel 29 (FIGS. 3 and 4), but are insulated from each other by layers of Mylar tapes 25 and 26 being interposed therebetween. The longitudinal axes of the metal layers 23 and 24, are offset from each other approximately $5/32$ inch so that an edge of one of the layers of metal is recessed a predetermined amount with respect to the adjacent edge of the other layer of metal on one end of the capacitor 22 and the edge of the other layer of metal is recessed a like amount on the other end of the capacitor. The dielectric tapes 25 and 26 are of the proper width to expose approximately $1/16$ inch strip of the strip of the extending edge of each of the layers of metal 23 and 24.

The apparatus 20 includes a clamping device (FIGS. 2 and 4), designated generally by the numeral 27, which is supported by a base plate 28 forming a portion of the framework of the apparatus. The clamping device 27 is used for clamping successive capacitors 22—22 in a molding position and includes a normally stationary jaw 31 secured adjustably to the plate 28 and a reciprocating jaw 32 mounted movably parallel to the upper surface of the base plate 28. The normally stationary jaw 31 is secured to a slotted block 36 mounted slidably on the base plate 28 to permit accurate positioning of the clamping jaw 31 and thus the axial position of the capacitor 22 located in the clamping device 27 in preparation for and during a molding operation. The reciprocating clamping jaw 32 is supported by and projects from a metal block 37 which, in turn, is mounted on a pair of roller bearings 38—38 secured thereto by eccentrics. The positions of the bearings 38—38 are adjusted by turning the eccentrics so that the bearings rest on the base plate 28 to permit accurate control of the vertical position of the reciprocating clamping jaw 32 when the jaw 32 is reciprocated by a fluid-activated piston-cylinder assembly, designated generally by the numeral 41.

Abutting portions 42—42 of the clamping jaws and concave capacitor-engaging surfaces 43—43 of the jaws 31 and 32 are covered with a suitable material 46, such as shock-resistant rubber, to compensate for variations in the sizes of the capacitors 22—22, to insure that sufficient pressure is applied to undersized capacitors and to prevent excessive pressure from being applied to oversized capacitors. The jaws 31 and 32 cooperate to support successive capacitors 22—22 in the molding position. The jaws 31 and 32 are provided with projecting jaw segments 47—47 (FIG. 4) utilized for applying pressures transversely of the capacitors 22—22 adjacent to, but outwardly of the recessed edges of the metal foils or layers of metals 23 and 24 forming the plates of the capacitors, to confine penetration of molten solder 48 into the ends 51—51 of the capacitors to a desired depth during a molding operation. It should be understood that the depth of penetration of the solder 48 in the ends 51—51 of the capacitors 22—22 can also be determined by controlling the temperature and pressure of the solder, length of time the pressure is applied to the solder and the rate of cooling of the solder terminations 21—21 in accordance with certain principles of the present invention.

The apparatus 20 (FIGS. 1 and 2) includes a pair of stainless-steel solder chambers, designated generally by the numerals 52—52, mounted for reciprocation toward and away from each other on the base plate 28. The solder chamber 52—52 are supported on the base plate 28 by slotted aluminum blocks, designated generally by the numerals 53—53 which, in turn, are supported by roller bearings 56—56 mounted on eccentrics. The aluminum blocks 53—53 are interconnected by guide rods 57—57 secured in threaded apertures 58—58 in one of the blocks 53—53 and mounted slidably in apertures 61 in the other block 53. The guide rods 57—57 maintain the blocks 53—53 and chambers 52—52 in alignment with each other during the reciprocation thereof. The solder chambers 52—52 are secured in spaced relationship to and effectively insulated thermally from the associated aluminum blocks 53—53 by stainless-steel pins 62—62 to reduce heat transfer from the chambers to the blocks. The aluminum blocks 53—53 are reciprocated toward and away from each other by a pair of fluid-actuated piston-cylinder assemblies, designated generally by the numerals 63—63.

Screws 67—67 having concentric sleeves 66—66 thereon are secured in threaded apertures 68—68 in the slotted blocks 53—53, supporting the associated solder chambers 52—52, and are utilized for mounting stainless-steel mold plates, designated generally by the numerals 71—71 on each side of the clamping device 27 for reciprocation axially of the capacitor 22 positioned therein. There are several designs of mold cavities 72—72 in the mold plates 71—71 suitable to confine the molten solder 48 around the ends 51—51 of the capacitors 22—22 held in the clamping device 27. A particularly advantageous design of cavities 72—72 is formed by a four-piece combined clamp and mold, where the two mold plates 71—71, approximately 3⅝ inches square and 3⁄16 inch thick, are pressed against the ends of the two clamping jaws 31 and 32 to form positive seals therebetween. In this design the length of the terminated capacitors 22—22 is uniform and the thicknesses of the terminations 21—21 vary with variations in the lengths of the unterminated capacitors. This design requires no knock-out pins; however, knock-out pins may be added to the clamping jaws 31 and 32 if desired.

The mold plates 71—71 are reciprocated axially of the capacitors 22—22 toward and away from each other and into and out of engagement with the associated ends of the clamping jaws 31 and 32. The mold plates 71—71 have cavities 72—72 of a cross section similar to that of the capacitor 22 supported in the clamping jaws 31 and 32, on adjacent sides thereof, which are designed to cooperate with the ends of the clamping jaws to form mold cavities. The mold cavities 72—72 permit up to approximately 0.5 cubic inch of molten solder 48 to be injected therein from the associated solder chambers 52—52 and are used to confine the molten solder 48 adjacent to the complementary shaped ends 51—51 of successive capacitors 22—22 to form terminations 21—21 on the ends of successive capacitors.

A nozzle 73 is formed on the end of a tube 74 projecting from each of the solder chambers 52—52 through which molten solder 48 is formed into apertures 76—76, having a diameter of the order of ⅛ inch, in the associated mold plates 71—71. The projecting tubes 74—74 are approximately 0.250 inch in diameter and have an internal diameter of approximately 0.156 inch. The tips of the nozzles 73—73, which may be rounded, frustoconically tapered or any other suitable shape, are designed to be inserted into the complementary shaped apertures 76—76 of the mold plates 71—71. It is preferable that the tips of the nozzles 73—73 be rounded to permit some degree of annular misalignment of the nozzles with respect to complementary shaped depressions 78—78 in the mold plates 71—71 forming the apertures 76—76 without resulting in solder 48 leaking between the nozzles and mold plates.

The areas of contact of the tips of the nozzles 73—73 with the back of the mold plates 71—71 and the length of time the nozzles contact the mold plates should be reduced to a minimum to minimize the amount of heat transferred from the solder chambers 52—52 to the mold plates. The nozzles 73—73 should completely cover the inside surfaces of the apertures 76—76 of the mold plates 71—71 so that these surfaces will not be contacted by the molten solder 48 confined in the mold cavities 72—72. This is achieved by providing complementary shaped surfaces on the nozzles 73—73 and the apertures 76—76 and by cutting away the material of the back of the mold plates 71—71 to form the depressions 78—78 adjacent to the apertures. Between successive molding operations, the mold plates 71—71 are held at least ⅛ inch from the nozzles 73—73 by compression springs 81—81 positioned between the mold plates 71—71 and the ends of slotted blocks 53—53.

Spools 82—82 (FIGS. 1, 2, and 6) of electrically conductive metal wire 83 are supported rotatably on arbors 84—84 for supplying lead wires 83—83 to the ends 51—51 of each of the successive capacitors 22—22 through the apertures 76—76 or separate holes (FIG. 31) in the mold plates 71—71. It is desirable that the wires 83—83, from which the leads 83—83 are formed, be preheated by being passed in close proximity to the solder chambers 52—52 or by other suitable means to improve adherence of the solder 48 of the terminations 21—21 to the lead wires 83—83. It is preferable that the wires 83—83 be passed directly through the molten solder 48 prior to the molding operation to pretin and preheat the lead wires 83—83 and to achieve better connections between the lead wires and the solder portions of the terminations 21—21. When the wires 83—83 are pulled through the solder chambers 52—52 to pretin and preheat the lead wires and enter the mold cavities 72—72 through orifices, designated generally by the numerals 86—86 (FIG. 3), in the injection nozzles 73—73, the lead wires can be more accurately located on the ends 51—51 of the capacitors 22—22 and can be used to pull any frozen solder 48 out of the orifices 86—86 of the injection nozzles to clean out the orifices. The frozen solder 48 removed from the orifices 86—86 projects from the main mass of the solder terminations 21—21 and encompasses portions of the lead wires 83—83 to strengthen the lead wires.

Each of the solder chambers 52—52 (FIGS. 3 and 4) is provided with a cylindrical bore 88 and a plurality counterbore 91, 92, 93, 94 and 95 which cooperates to form a substantially horizontal, cylindrical passage, designated generally by the numeral 96, aligned with the orifice 86 in the nozzle 73 projecting from the associated chamber 52 to permit each of the lead wires 83—83 to be fed directly through the associated chamber and nozzle to form wire leads 83—83 on successive terminated capacitors 22—22. Vertically extending tubes 97—97 having internal diameters of approximately 0.156 inch are provided. The tubes 97—97 project below the surfaces of the molten solder 48 contained in the chambers to within approximately 1/16 inch from the bottom thereof and communicate with the nozzles 73—73 and the counterbores 94—94 through bores 98—98 to permit solder to be forced through the tubes 97—97 and into the nozzles when compressed air is applied to the upper surfaces of the molten solder in the chambers through tubes 100—100. Vertical apertures 101—101 approximately 0.250 inch in diameter intersect the horizontal passages 96—96 to permit the compressed air, which is applied to the top of the molten solder 48, to pass through the bores 88—88 arounnd the lead wires 83—83 to prevent the solder from being forced rearwardly along the lead wires from the nozzles 73—73 through close fitting stainless-steel tubes 102—102 having approximately 0.07 inch external diameter and an internal diameter of the order of 0.04 inch.

A combined seal and hitch feed device (FIG. 3), designated generally by the numeral 103, is provided at the end of a tube 104 secured by a press fit in the counterbore 91 and projecting from each of the solder chambers 52—52 through the slotted blocks 53—53 to feed the lead wires 83—83 from the supply spools 82—82 and to prevent the compressed air from escaping from the solder chambers through the tubes 104—104. Each combined seal and hitch feed device 103 is formed of a collar 106 having a frustoconically shaped bore 107 therein into which a substantially-complementary, externally-shaped rubber or plastic frustoconical sleeve 108 is positioned. An internal cylindrical bore 109 in the sleeve 108 fits closely around successive sections of the lead wire 83 being fed therethrough. The sleeves 108—108 slide rearwardly along the lead wires 83—83, secured to the previously terminated capacitors 22—22 by the solder terminations 21—21, when the solder chambers 52—52 are retracted; however, the sleeves maintain controlled tensions on the associated lead wires so that the leads are formed axially of the capacitors. When the solder chambers 52—52 are reciprocated toward each other in preparation for a molding operation, the sleeves 108—108 are urged rearwardly into engagement with the walls formed by the frustoconical bores 107—107 in the collars 106—106 to clamp the lead wires 83—83 and feed the lead wires forwardly.

The stainless-steel tubes 102—102 (FIGS. 3 and 4) extend into the center of the injection nozzles 73—73 to within approximately 1/8 inch of lands 111—111 of the orifices 86—86 of the nozzles to support the lead wires 83—83 passing through the nozzles and into the mold cavities through the apertures 76—76. The stainless-steel tubes 102—102 prevent the associated lead wires 83—83 from being bent inside the nozzles 73—73 as successive terminated capacitors 22—22 are moved transversely of the nozzles during successive molding operations. Since the solder 48 flows back out of the nozzles 73—73 into the solder chamber 52—52 while the wires 83—83 are being pulled through the nozzles between molding operations, the surface areas of the portions of the wires 83—83 extending forwardly from the tubes 102—102 during the molding operation are the only areas of the wires exposed to the solder 48. As the solder 48 is forced into the mold cavities 72—72, the tubes 102—102, in combination with the compressed air being fed through the apertures 101—101, prevent excessive solder from being deposited along substantial lengths of the lead wires 83—83. Any solder which is deposited on the portion of the wire 83 extending into the tube 102 will not interfere with the wire being pulled through the nozzle 73 since the inner diameter of the tube is less than the inner diameter of the nozzle.

The nozzles 73—73 are urged into engagement with the mold plates 71—71 against the action of the compression springs 81—81 just prior to injection of the molten solder 48 into the mold cavities 72—72. This reduces heat losses from the nozzles 73—73 to the mold plates 71—71 and permits a faster solder-cooling rate after the injection of the molten solder 48 into the mold cavities 72—72. Dried and filtered inert gases are then forced into the solder chambers 52—52 through the tubes 100—100 to apply pressure to the solder 48 in the chambers for forcing the molten solder through the nozzles 73—73, into the cavities 72—72 in the mold plates 71—71 and into the interstitial spaces between the layers 23 and 24, and 25 and 26 of conductive and dielectric materials, respectively, of the capacitor 22 with a predetermined force. The conditioning gases also provide a vehicle for adding constituents beneficial for healing of the capacitors 22—22, causing longer life of the capacitors and making the capacitors more resistant to moisture. One pulse of compressed air or a suitable gas is all that is necessary to force the molten solder 48 through each of the nozzles 73—73 and into the associated relatively cool stainless-steel mold plates 71—71 where the solder solidifies, at a relatively rapid rate, up to the region of the nozzle.

It will be understood that, if desired, plungers (not shown) might be utilized to force the molten solder 48 from the chambers 52—52 and into the mold cavities 72—72; however, it is advantageous to use the pressurized air as a means for forcing the molten solder out of the solder chambers and into the mold cavities because of the flexibility it affords in the control of parameters such as pressure magnitude, duration, rate of change of pressure, and the like. The use of pressurized air also eliminates the necessity of using valves (not shown) in direct contact with the molten solder 48. By using air under pressure to force the solder 48 out of the chambers 52—52, no moving parts are required in the injection system, except for the moving parts of a valve (not shown) for controlling the air. The molten solder 48 is forced from the chambers 52—52 by the pressurized air and is expressed into the interstices in the ends 51—51 of relatively tightly wound capacitors 22—22 with unexpectedly even distribution which, when the solder cools, affords strong mechanical connections capable of withstanding in excess of 20 pounds pull for a 1½ microfarad metalized-Mylar capacitor having a cross-sectional area of approximately 0.20 square inch. The areas of contact of the solder 48 with the edges of the layers of metal 23 and 24 forming the plates of the capacitors 22—22 are increased effectively by utilizing principles of the present which permits penetration of the solder into interstitial spaces of less than 0.001 inch wide.

The sizes and shapes of the orifices 86—86 of the nozzles 73—73 will help dictate the velocity of the injection of the molten solder 48 for any given pressure on the molten solder in the chambers 22—22. The nozzles 73—73 are provided with frusto-conical exits 113—113 approximately 0.031 inch long with an included angle of the order of 60°, and 1/32 to 1/16 inch lands 111—111 approximately 0.045 inch in diameter, when the diameter of lead wires 83—83 passing therethrough are approximately 0.032 inch. This insures that each of the metal terminations 21—21 will pull the solidified solder 48 out of the exit 113 of the associated orifice 86 and clean the orifice automatically after each molding operation. It may be desirable to have a longer land 111 to provide a longer sleeve or fillet 114 of the solder 48 around the associated lead wire 83 in the finished termination 21; however, if the length of the land 111 is increased appreciably, the diameter of the orifice 86 must be increased to obtain the same injection rate with a given size of the wire 83 and a given injection pressure. If the length of the land 111 is excessive, difficulty may be encountered in removing the frozen fillet 114 from the nozzle 73 subsequent to the molding operation, unless the land is tapered.

When the terminated capacitor 22 is removed from the mold cavities 72—72, the cold solder 48 breaks off at the reduced cross section in the land 111 of the orifice 86 of the nozzle 73 to form the fillet 114 around the lead wire 83. Any frozen solder 48 left in the nozzle 73 will be melted normally by the heat in the nozzle before the next surge of solder 48 occurs in a subsequent molding operation. However, if the temperature of the nozzle 73 is not high enough to melt the frozen solder 48 left in the nozzle, the solder will not be forced out of the nozzle when the solder is forced into the nozzle in a subsequent operation.

Figure 3:
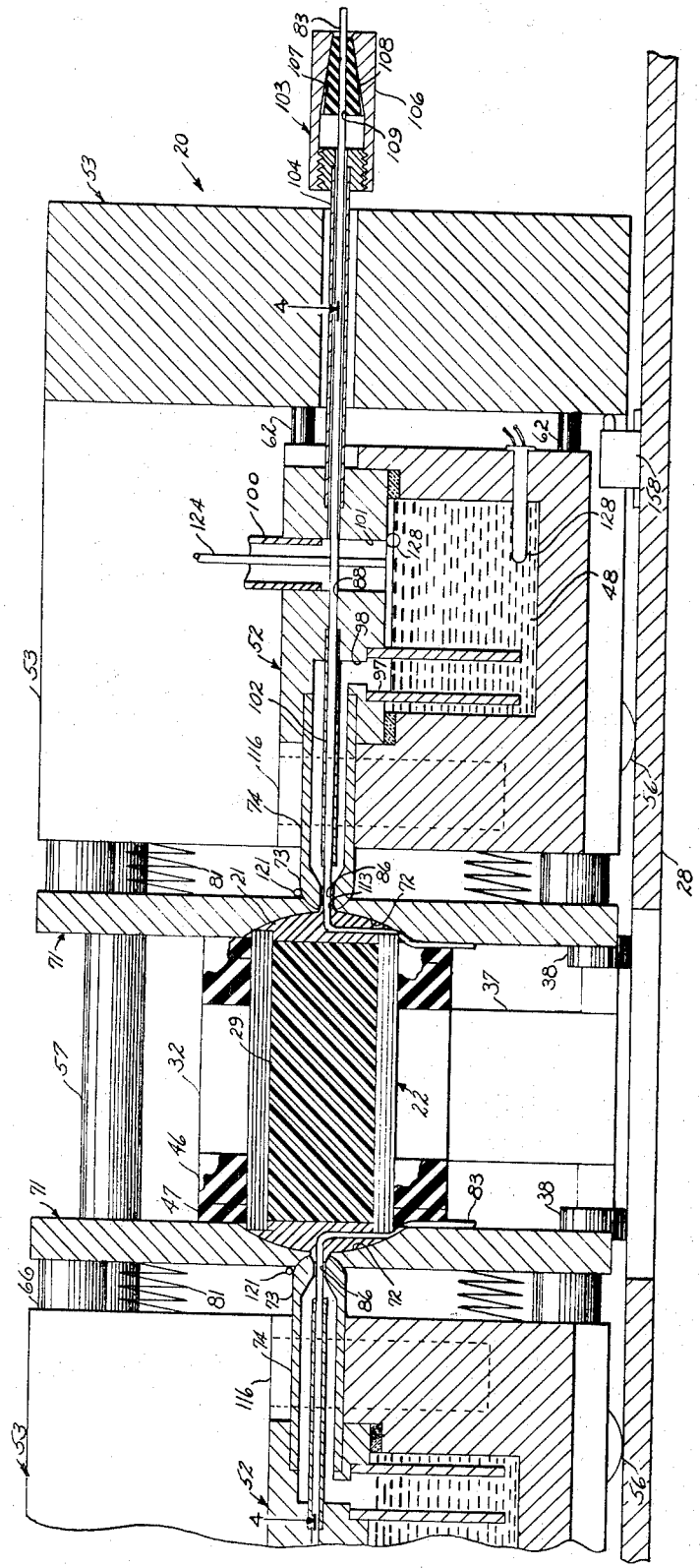
FIG. 3 is a fragmentary, enlarged, vertical, sectional view of the apparatus of FIG. 2 taken along line 3—3 thereof, illustrating the apparatus in a different operating position.

The solder chambers 52—52 are each designed to contain approximately 1.25 cubic inches of the molten solder 48 and are each heated to a temperature of the order of 520° F. by two separate 200-watt heating elements 116—116 (FIG. 4) inserted into close fitting brass sleeves 118—118 secured in wells 119—119 machined into the casing of the solder chambers 52—52. The two heating elements 116—116 of each chamber 52 are positioned on opposite sides of the injection nozzle 73, projecting from the face of the chamber 52 adjacent to the other chamber, to facilitate maintaining the temperature of the nozzle and the temperature of the chamber 52 at approximately 520° F. The temperatures of the nozzles 73—73 are monitored by thermocouples 121—121 (FIGS. 3 and 6). The temperature of the chamber 52 is monitored by thermocouples 120—120 (FIG. 6) to prevent the heating elements 116—116 from overheating due to the thermal time lag of the stainless-steel chamber.

It is desirable that the volume of the molten solder 48 in each of the chambers 52—52 be kept to a minimum in order to reduce the possibility of contamination, to prevent high temperature deterioration, to facilitate quick changing of the type of solder used and to make the solder available for use at all times. A combined seal and hitch feed device 123 is provided at the end of the tube 100, projecting from the top of each of the solder chambers 52—52 through which the air pressure is injected into the associated chambers.

The combined seal and hitch feed devices 123—123 are similar in design to the devices 103—103 described above and are utilized to feed solder wires 124—124 into the chambers 52—52 from supply spools 126—126 and prevent air from escaping from the solder chambers 52—52 through the tubes 100—100. Stationary, solenoid-operated solder clamps, designated generally by the numerals 127—127, are actuated to clamp the solder wires 124—124 during the retraction of the solder chambers 52—52 only when the levels of the molten solder 48 in the associated chambers recede below a predetermined level.

The levels of the solder 48 in the solder chambers 52—52 are monitored by temperature-sensitive elements 128—128 (FIG. 3) such as thermocouples, thermistors, or the like which are relatively insensitive to the effect of dross in the baths of solder in the chambers. The necessity of changing the temperature adjustment of the elements 128—128 as the temperature of the solder 48 changes, is eliminated by using two of the temperature-sensitive elements 128—128 in each of the chambers 52—52. One of the temperature-sensitive elements 128—128 is placed near the bottom of the solder 48 in the chamber 52 and the second temperature-sensitive element 128 is positioned at the desired level of the solder in the chamber. The outputs of the two elements 128—128 are connected in series opposition with each other so that a voltage difference exists whenever the upper surface of the solder 48 in the chamber 52 is below the desired level. The voltage approaches zero when the solder 48 in the chamber 52 is at the desired level. The resultant output of the temperature-sensitive elements 128—128 of each of the chambers 52—52 is connected to a separate sensitive relay 129 (FIG. 6) which is actuated whenever the level of the solder 48 in the associated chamber 52 is below the desired level. The relay 129 is used to energize the solder clamp 127 associated with the particular chamber 52. The relatively long time constants of temperature transducers 128—128 is used to advantage to prevent chattering of the relays 129—129 because of vibrations of the solder chambers 52—52 as the solder chambers are advanced and retracted during successive molding operations.

A series of capacitors 22—22 are fed successively, transversely of the axes of the capacitors, to the molding position. The capacitors 22—22 are fed vertically downwardly from a magazine, designated generally by the numeral 131 (FIG. 1), to the clamping device 27 located in coaxial alignment with the nozzles 73—73 by a resilient receptacle 132 on the side of a reciprocating shuttle bar, designated generally by the numeral 133. The capacitor 22 is clamped in the clamping device 27, the shuttle bar 133 is withdrawn from the clamping device 27 and the mold plates 71—71 and nozzles 73—73 are reciprocated into molding position. The solder 48 is injected into the mold cavities 72—72 and is expressed into the interstitial spaces in th ends 51—51 of the capacitor 22. The mold plates 71—71 are maintained inherently at a relatively low temperature of the order of 100° F. by the ambient atmosphere so that the solder 48 in the mold cavities 72—72 is frozen into its solid state to form termination 21—21 in a fraction of a second.

Even though the solder 48 is maintained at a temperature above 520° F. which is above the melting point of the Mylar tapes 25 and 26, the solder can be cooled rapidly enough so that the heat from the molten solder has no noticeable detrimental effects on the Mylar tapes 25 and 26. The capacitor 22 is held in the clamping device 27 for a relatively short period of time, for example, approximately one second, depending on the many parameters of the various phases of the process. The shuttle bar 133 is reciprocated downwardly into an aperture 136 formed by slots in the jaws 31 and 32 of the clamping device 27 to remove the terminated capacitor 22 from the clamping device by means of a resilient receptacle 134 on the end of the shuttle bar and to deposit an unterminated capacitor 22 in the clamping device 27 by means of the resilient receptacle 132 on the side of the shuttle bar. The length of travel of the shuttle bar 133 or the travel of the solder chambers 52—52 can be used to determine the length of the lead wires 83—83.

An electrical control circuit, designated generally by the numeral 140, (FIG. 8) is provided to control the sequence of operation of the apparatus 20 and the effective periods of the various cycles of the operation. A normally open, hand-operated start switch 141 is provided for starting the cycle of operation of the apparatus 20 by energizing a coil 142 of a solenoid valve 143 through a normally closed, time-to-open contact 144 of a time-delay relay 145. The solenoid valve 143 when energized admits air to the piston-cylinder assembly 41 to reciprocate the movable clamping jaw 32 into engagement with the stationary jaw 31 and close the clamping device 27 on the capacitor 22 held in the receptacle 132 on the side of the shuttle bar 133. A pair of time-delay relays 147 and 148 are connected in series with the start switch 141, the coil 142 of the solenoid valve 143 and the contact 144. The relay 147 is used to close a normally open contact 149 in series with a coil 152 of a solenoid valve 153 after the clamping jaw 32 is urged forward into engagement with the stationary clamping jaw 31 in preparation for a molding operation. The solenoid valve 153, when energized, directs fluid to a piston-cylinder assembly (not shown) attached to the shuttle bar 133 which causes the shuttle bar to be retracted leaving capacitor 22, which was secured resiliently in the receptacle 132 on the side of the shuttle bar, in the clamping device 27.

The other relay 148 is utilized to close a normally open contact 154 in series with the coil 156 of a solenoid valve 157 through a normally closed contact 160 of the time-delay delay 145. When the coil 156 of the solenoid valve 157 is energized, pressurized air is applied to the ends of the cylinders of the assemblies 63—63 to move the slotted blocks 53—53, the solder chambers 52—52, the projecting nozzles 73—73, and the attached mold plates 71—71 towards each other so that the cavities 72—72 on the faces of the mold plates encompass the ends 51—51 of the capacitors 22—22. The positioning of the slotted blocks 53—53 in the desired forward positions is detected by sensitive limit switches 158—158.

When the sensitive limit switches 158—158 are closed, a time-delay relay 159 is energized which, in turn, closes a normally open contact 161 in series with a pair of limit switches 163—163 secured to the slotted blocks 53—53 and used to detect the engagement of the tips 77—77 of the nozzles 73—73 with the depressed portion of the mold plates 71—71 around the apertures 76—76. The time-delay relay 159 is provided to compensate for reasonable tolerances of switches 163—163 and to insure that the pressures in the cylinders of the assemblies 63—63 is built up sufficiently before coils 164—164 of a pair of injection solenoid valves 166—166 are energized through the contact 154 of the relay 148, the switches 163—163 and a normally closed contact 167 of a time-delay relay 168 so that the solder 48 will not leak from the mold cavities 72—72 or apertures 76—76 and cause flash to form on the terminated capacitor 22.

A predetermined time after the time-delay relay 168 and the injected solenoid valves 166—166 are energized, the normally closed contact 167 will be opened to de-energize the injection solenoid valves 166—166, and normally open contacts 171 and 172 of the time-delay relay 168 will be closed to hold the relay 168 energized and complete a circuit to the time-delay relay 145, respectively. After sufficient time for the air pressure in the solder chambers 52—52 to drop to atmosphere pressure and for the solder in the terminations 21—21 to solidify, a normally opened, instantaneously closing contact 173 of the relay 145 will be closed. The closure of the contact 173 causes coils 174—174 of a pair of solenoid valves 176—176 to be energized to relieve the pressure on the cylinders of the assemblies 63—63 urging the mold plates 71—71 against the clamping jaws 31 and 32 and to apply pressurized air to the opposite ends of the cylinders of the assemblies 63—63 causing the mold plates 71—71 to be retracted.

After a short delay, the time-to-open contact 144 of the time-delay relay 145 will open to de-energize the solenoid valve 143 which, in turn, releases the pressure on the cylinder of the assembly 41 permitting the clamping jaw 32 to be retracted by a spring return piston (not shown) in the assembly 41. When the clamping jaw 32 is retracted, a normally open, limit switch 177 is closed to energize a coil 178 of a solenoid valve 180 through a now-closed, normally open contact 179 of the relay 145 to direct fluid into the cylinder of the assembly (not shown) to extend the shuttle bar 133 to remove the terminated capacitor 22 from the molding position and to place an unterminated capacitor 22 into the molding position in preparation for a subsequent molding operation.

Figure 9:
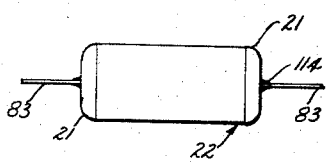
FIG. 9 to 12 illustrate capacitors having various types or combined types of leads embodying certain principles of the present invention.
Figure 10:
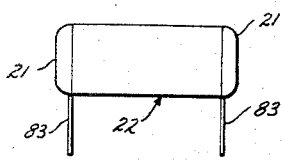
Figure 11:
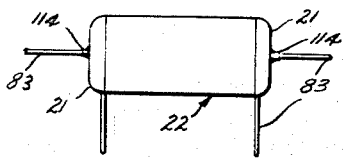

When the terminated capacitors 22—22 are removed from the clamping device 27, the lead wires 83—83 are pulled from the supply spools 82—82. The lead wires 83—83 secure the successive capacitors 22—22 together permitting the lead wires 83—83 to be cut subsequently to form axial leads 83—83 illustrated in FIG. 9, radial leads 83—83 as illustrated in FIG. 10, both radial and axial leads 83—83 as illustrated in FIG. 11, or one radial lead 83 and one axial lead 83 as illustrated on FIG. 11. The leads 83—83 may also be cut while the capacitor 22 is in the molding position by the cooperation of cutting devices (not shown) on the mold plates 71—71 and the clamping device 27.

The cycle of operation starts with the clamping jaw 32, mold plates 71—71, injection nozzles 73—73, and solder chambers 52—52 retracted and the capacitor 22 held in a molding position by the receptacle 132 on the shuttle bar 133. The clamping piston-cylinder assembly 41 is actuated to move the reciprocating clamping jaw 32 against the stationary clamping jaw 31 to clamp the capacitor 22 in a predetermined position centered on all three major axes. The shuttle bar 133 is retracted and the piston-cylinder assemblies 63—63 are actuated to move the mold plates 71—71 against the ends of the clamping jaws 31 and 32 with the ends 51—51 of the capacitor 22, to be terminated, extending into the mold cavities 72—72. With continued movement of the piston (not shown) in the piston-cylinder assemblies 63—63, the slotted blocks 53—53 actuate the limit switches 158—158 and the injection nozzles 73—73 contact the mold plates 71—71. Actuators 181—181 on the two sensitive switches 163—163 secured to the slotted block 53—53, supporting the solder chambers 52—52 and mold plates 71—71, are depressed when the nozzles 73—73 are urged against the mold plates 71—71.

Since the nozzles 73—73 cool down rapidly, for example, at a rate of the order of 100° F. per second when in contact with 3/16 inch-thick, stainless-steel, mold plates 71—71, the delay between the time the nozzles 73—73 touch the mold plates and the time the solder 48 is injected into the mold cavities 72—72 is preferably held to a minimum so that the nozzles do not cool down any more than necessary prior to injecting the solder. A predetermined time after the sensitive switches 163—163 are closed, the solder injection cycle is initiated by energizing the solenoid valves 166—166 to cause pressurized air to be applied to both of the solder chambers 52—52 simultaneously for a predetermined duration thus causing the solder 48 to be injected into the mold cavities 72—72.

When voltage is applied to the coils 164—164 of the solenoid valve 166—166, it takes approximately two microseconds for full direct current voltage to be applied to the coils 164—164 of the solenoid valve and approximately 0.002 second for the valve 166—166 to start to open. The valves 166—166 are opened fully after approximately 0.0035 second. The solder 48 starts to enter the cavities 72—72 of the mold plates 71—71 after approximately 0.007 second. The pressure in the nozzles 73—73 starts to rise after approximately 0.008 second and a substantial quantity of the solder 48 is in the cavities 72—72 of the mold plates 71—71 in the order of 0.015 second. The pressure of the solder 48 in the nozzles 73—73 reaches a maximum after approximately 0.150 second, at which time the solder 48 commences to shrink because of the cooling effect of the mold plates 71—71. There is a noticeable increase in the rate of cooling of the solder 48 in the cavities 72—72 of the mold plates 71—71 after one second and maximum shrinkage of the solder in the mold plates occurs in approximately 1.5 seconds.

The following examples are set forth to more fully illustrate the invention and are not intended to limit the invention in any way.

EXAMPLE 1

A round, 0.5 microfarad capacitor 22 approximately ½-inch in diameter is formed of spirally wound interleaved layers of lead foil and Mylar or styrene insulating tape. The lead foil is approximately 0.00025 inch thick and insulating tape is of the order of 0.001 inch in thickness. An edge of one of the lead foils is flush with the edge of the insulating tape and extends approximately 5/64-inch beyond the edge of the other lead foil on each end of the capacitor. The capacitor is placed in a modified clamping device (not shown) associated with the embodiment apparatus 20 illustrated in FIG. 1 to 6, inclusive. The mold plates 71—71 in the apparatus 20, which remain approximately 100° F., are urged against the ends the clamping jaws 31 and 32 of the clamping device 27. The nozzles 73—73 are maintain at approximately 430° F. and are urged into the apertures 76—76 in the mold plates 71—71 with a pressure of approximately 100 pounds per square inch. Approximately 0.1 to 0.2 cubic inch of 60–40 solder 48 of the order of 430° F. is forced through each of the nozzles 73—73 into the mold plates 71—71 by pressurized air exerting a static injection pressure of approximately 2.5 pounds per square inch for approximately 1.0 second. The first portion of the solder 48 reaches the mold cavities 72—72 in approximately 0.008 second. Full injection pressure is reached in approximately 0.150 second at which time the solder 48 in the cavities 72—72 starts the freeze. Most of the solder 48 in the mold cavities 72—72 is frozen in approximately one second, and the hold plates 71—71 are removeld from the terminated capacitor 22 so that the capacitor remains in the clamping device 27 for a total period of approximately two seconds.

EXAMPLE 2

A round, 1.0 microfarad capacitor 22 approximately ½-inch in diameter is formed of alternate spirally wound zinc coated metalized Mylar tapes and plain Mylar tapes. The Mylar tapes are of the order of 0.00025 inch thick and the zinc coating on the Mylar tapes are approximately 0.000003 inch thick. One of the zinc coated Mylar tapes extends approximately ²⁄₆₄-inch beyond the plain Mylar tape and approximately ⁷⁄₆₄-inch beyond the adjacent edge of the other metalized Mylar tape on each end of the capacitor 22. The capacitor 22 is terminated with approximately 0.1 to 0.2 cubic inch of 60–40 solder in a manner and with the apparatus 20 described above with respect to Example 1 and the preferred embodiment of the invention, except the solder 48 is injected into the mold cavities 72—72 by utilizing sufficient pressurized air to apply approximately 60 pounds per square inch static pressure on the solder 48 in the nozzles 73—73.

EXAMPLE 3

A flat metalized Mylar capacitor 22 having a value of approximately 1.5 microfarads, is formed by wrapping alternate layers of zinc coated, metalized Mylar and plain Mylar tape on a 0.032 inch by 0.600 inch by 1.5 inch rectangular mandrel 29 (FIGS. 3 and 4) so that each tape forms approximately 162 convolutions. The thicknesses of the tape and metal layers are substantially the same as described above with respect to Example 2. The conductive layer of zinc on one of the metalized Mylar tapes extends approximately $\frac{1}{32}$-inch beyond the adjacent edge of the plain Mylar tape and approximately $\frac{5}{32}$-inch beyond adjacent edge of the other metalized Mylar tape on each end of the capacitor 22. Approximately 0.1 to 0.4 cubic inch of the solder 48 is used to form a termination on each end 51 of the capacitor 22 in a manner and with apparatus 20 similar to those defined above with respect to Example 1 except the static injection pressure is appproximately 80 pounds per square inch.

EXAMPLE 4

The capacitor 22 is similar in construction and properties as the capacitor described above with respect to Example 1 except that the conductive plates of the capacitor are metalized layers of zinc deposited on Mylar or styrene tapes of the same thicknesses as defined in Example 2. In this case the method and apparatus 20 for terminating the capacitor are the same as used in Example 1 except that the static injection pressure is approximately 40 pounds per square inch.

EXAMPLE 5

The capacitor, method and apparatus 20 utilized in this example is the same as used in Example 3 except that the conductive layers of zinc forming the plates of the capacitor do not extend beyond the edges of the adjacent layers of plain Mylar tapes on the ends of the capacitor.

Figure 14:
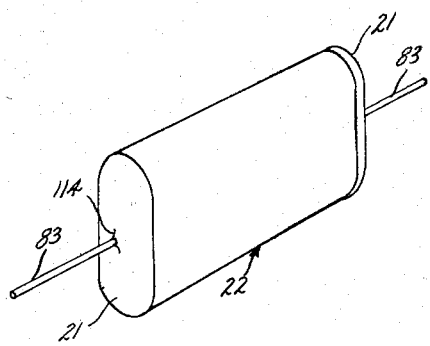
Figure 15:
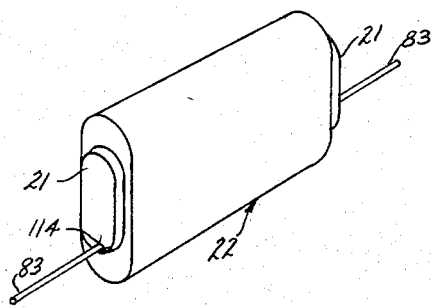
Figure 12:
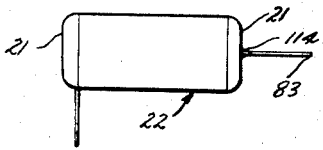
Figure 16:
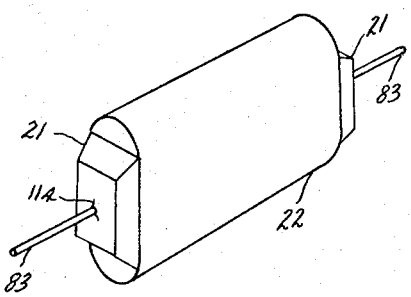
Figure 13:
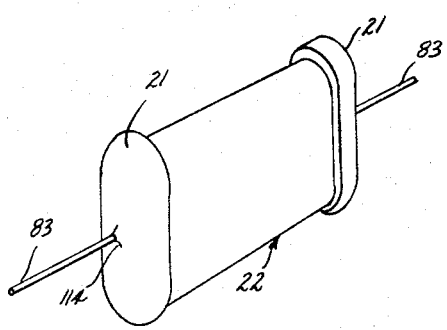
Figure 17:
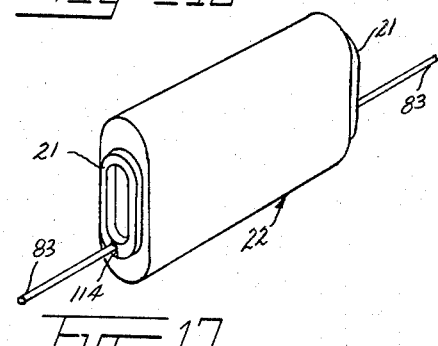
Figure 18:
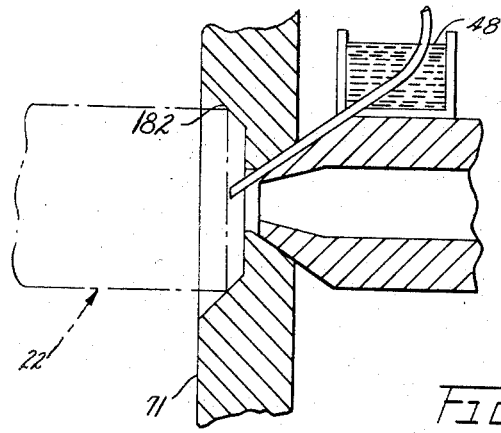
Figure 19:
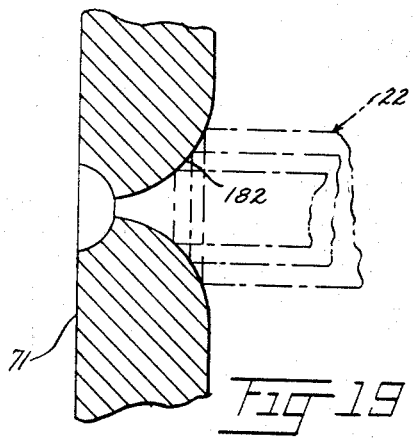
Figure 20:
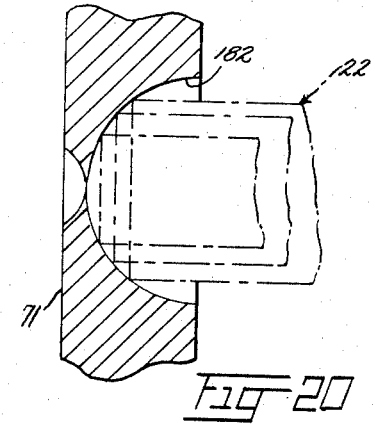

The size and shape of the cavities 72—72 of the mold plates 71—71 are designed carefully so that the solder 48 confined in the mold plates will completely encase the ends 51—51 of the capacitor 22 as illustrated in FIG. 13, cover the end of the capacitor as illustrated in FIG. 14 or partially encase the end of the capacitor by molding a narrow strip of solder across or around the end of the capacitor as illustrated in FIGS. 15 and 16 and FIG. 17, respectively. The mold cavities 72—72 are designed to eliminate flash, so that no subsequent flash removal operation is provided. The shape of the mold cavities 72—72 and the material from which the mold plates 71—71 are made can be used to control the rate of cooling of the molten solder 48. Although not desirable, it may be necessary in some instances to provide the mold plates 71—71 with auxiliary cooling means (not shown); however, it is preferable that the mold plates 71—71 be formed of polished stainless steel, which remains sufficiently cool to chill the solder 48 forming each termination rapidly enough to prevent detrimental degradation of the conductive and dielectric materials of the capacitors 22—22.

The mold cavities 72—72 may be formed by forcing the mold plates 71—71 directly against the ends of the capacitors 22—22. The side walls 182—182 of the mold plates 71—71 may be provided with flat tapered surfaces as illustrated on FIG. 18 so that the thickness of the portion of the solder 48 which projects from the ends of the capacitors 22—22 will increase linearly with an increase in the size of the capacitors, and a particular sized mold cavity 72 can be used satisfactorily with a relatively wide range of sizes of capacitors 22—22. The walls 182—182 may be curved convexly as shown on FIG. 19 to prevent a tendency of the solder 48 to project beyond the sides of the capacitors 22—22. If the walls 182—182 of the cavities 72—72 are curved convexly, the thickness of the solder 48 projecting from the ends of the capacitors 22—22 will also increase gradually with an increase in size of the capacitors molded. Concavely curved walls 182—182 (FIG. 20) may be utilized if it is desired that the thickness of the solder 48 projecting from the ends of the capacitors 22—22 increases at a relatively rapid rate with an increase in the size of the capacitors used, and it is desirable that the solder project beyond the edges of the ends of the capacitors.

Figure 22:
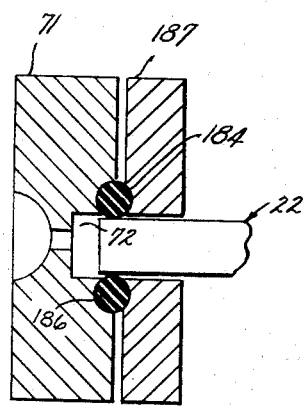
Figure 21:
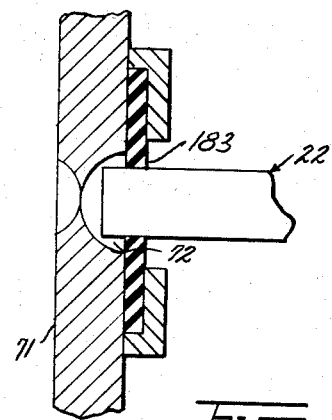

The ends 51—51 of the capacitors 22—22 may be enclosed completely to provide a better physical seal on the end of the capacitors, when the molds do not contact the clamping device (not shown) or a clamping device is not used, by utilizing a mold plate 71 having a cavity 72 larger than the end of the capacitors and an elastic gasket 183 to form a seal around the ends of the capacitors projecting into the end of the cavity as illustrated in FIG. 21. A stronger and more positive seal may be provided between the mold plate 71 and the side of the capacitor 22 by utilizing an O-ring 184 in a grooved portion 186 of the mold plate and a complementary-grooved portion of a clamping element 187 of the mold plate (FIG. 22). Prior to the molding operation, the clamping element 187 is urged against the mold plate 71 to compress the O-ring 184 and urge the O-ring against the sides of the capacitor 22 to form a seal between the capacitor and the mold cavity 72.

Figure 23:
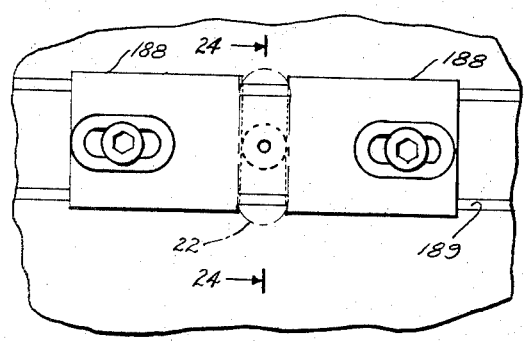
Figure 24:
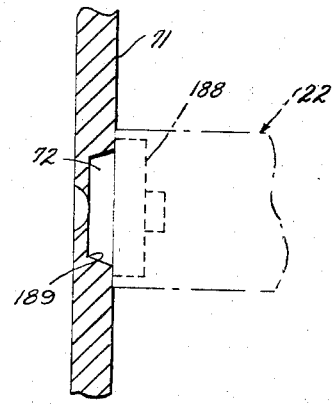

A termination 21 in the form of an extruded strip of the solder 48 extending transversely of the end 51 of the capacitor 22 (FIG. 16) is provided by using an adjustable mold plate 71 having a slotted cavity 72, which is narrower than the end of the capacitor (FIGS. 23 and 24). The mold plate 71 is provided with tapered, combined clamping and sealing elements 188—188 which are mounted slidably in a slot 189 on the face of the mold plate and are used to clamp the capacitor 22 and to prevent seepage of the molten solder 48 from the mold cavity 72 along the sides of the capacitor. This permits this type of mold plate 71 to be used to cover a wide range of sizes and types of the capacitors 22—22 and yet use a minimum volume of the solder 48 to form the termination 21.

Figure 25:
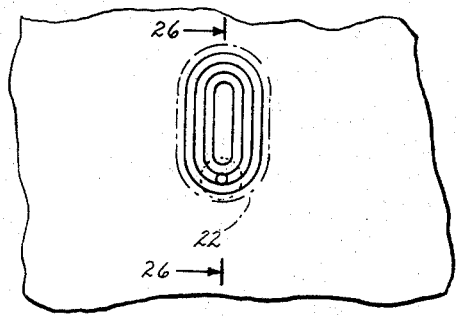
Figure 26:
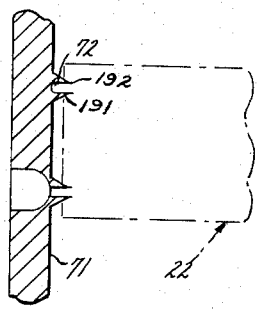
Figure 27:
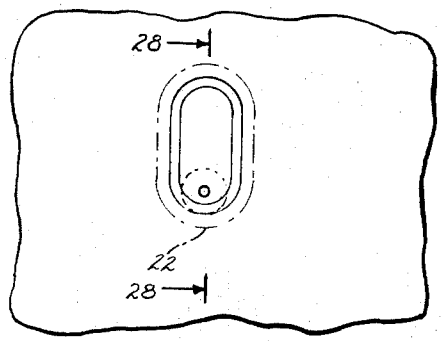
Figure 28:
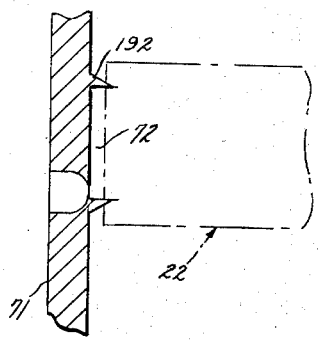

To provide an annular termination 21 on the ends 51—51 of the capacitors 22—22, the mold cavities 72—72 may be formed of two concentric annular knife edge projections 191 and 192 which penetrate the ends of the capacitor and are utilized to confine the molten solder 48 entering the mold cavities 72—72 and being expressed into the end of the capacitor (FIGS. 25 and 26). A strip or spot of solder (FIG. 15) which does not extend to the outer edge of the capacitor 22 is formed on the end of the capacitor by removing the inner knife edge projection 191 and making the outer knife edge projection 192 of any desired shape such as illustrated on FIGS. 27 and 28. In these types of mold cavities, the ends of the capacitors 22—22 are used to limit the travel of the mold plates 71—71 instead of using the ends of the clamping jaws 31 and 32 to limit the travel of the mold plates so that the thickness of the terminations 21—21 remains constant even though the length of the terminated capacitors 22—22 may vary.

Removable winding mandrels are utilized to support certain types of capacitors during the winding operation, particularly round capacitors. When the winding mandrel is removed from the capacitor, an axial aperture is left in the finished capacitor. In order to prevent solder from flowing into the center of the capacitor during a molding operation, the ends of the capacitor may be collapsed to close the hole on both ends. However, it is preferable to provide molds having portions 200—200 projecting from the centers of the cavities which project into the center of the capacitors 22—22 (FIG. 30). As the molds are urged into engagement with the ends of the capacitor in preparation for a molding operation, the projections 200—200 are inserted into the hole in the capacitor to seal the hole and prevent solder from being expressed into the center of the capacitor during the formation of solder terminations thereon.

In some cases it is preferable that the mold plates 71—71 be urged against the ends 51—51 of the capacitors 22—22, with a relatively low force, i.e., 5 to 10 pounds, so that the edges of the layers of dielectric and conductive material of the capacitors are not forced together by the tapered sides or the walls 182—182 of the cavities 72—72 with sufficient force to prevent the solder 48 from entering the ends of the capacitors. The solder 48 is then injected into the mold cavities 72—72 under a relatively low pressure by applying air pressure to the solder chambers 52—52, and the pressure applied on the ends 51—51 of the capacitor 22, by the assemblies 63—63 through the mold plates 71—71, is increased simultaneously. The additional pressure applied by the assemblies 63—63 compresses the molten solder 48 in the interstitial spaces in the ends 51—51 of the capacitor 22 provided the action of the assemblies 63—63 is rapid enough to force the solder into the ends of the capacitor before the solder freezes in the mold cavities. In order to achieve this result, it is desirable that the properties of the mold plates 71—71 be such that the cooling rate of the solder 48 in the cavities 72—72 is less than if the injection is completed solely by the pressurized air applied to the solder 48 in the chambers 52—52.

In order to reduce the amount of air which may be forced into the mold cavities during the injection operation and to reduce the various passages to the flow of the molten solder 48, a solder chamber 252, in an alternative embodiment illustrated on FIG. 29, is provided with a nozzle tube 274 having a relatively large passage 275 to form a small reservoir of the molten solder 48 adjacent to an eccentric orifice 286 of the nozzle 273. An eccentric aperture 280 which is aligned with the eccentric orifice 286 is provided at the opposite end of the nozzle tube 274 near the upper portion thereof to permit some of the solder 48 to remain in the tube after the injection process. In this way, a column of air required to force the desired amount of the solder 48 into a cavity 272 of a mold plate 271 is reduced to a minimum and is limited to the volume occupied by a short length of a passage 298 leading to the bath of the solder 48 in the chamber 252 and the space occupied by the portion of the tube 274 above the lowest portion of the orifice 286 and aperture 280 which is not occupied by the solder 48 and lead wire 83 when the air pressure is relieved on the chamber 252. The solder 48 itself then forms a heat conductor leading to the orifice 286 in the nozzle tube 274 to keep the orifice 286 warm between successive injection operations. The diameter of the passage 298 should be kept to a minimum to limit the volume of air in front of the pool of the solder 48 in the chamber 252.

In another embodiment of the invention, a more efficient way of conducting heat through the solder 48 to nozzle 373 and at the same time substantially eliminating the amount of air entering a cavity 372 of a mold 371 during the injection of the molten solder 48 into the mold, is to attach the injection nozzle 373 to the bottom of a solder chamber 352 as illustrated in FIG. 30 and support the chamber 352 above an aperture 376 of the mold. The force of gravity on the solder 48 in the chamber 352 is then used to maintain the supply of the molten solder in the injection nozzle 373 at all times but is prevented from getting sufficiently high to overcome the resistance of an orifice 386 of the nozzle to the flow of the solder therethrough. When it is desirable to inject the solder 48 into the cavity 372 of the mold 371, additional forces may be exerted on the solder in the chamber 352 by applying pressurized air thereto through an air tube (not shown).

In order to insure a good electrical connection and mechanically strong joint, it is important that the volume of air in the ends of the capacitor 22 be controlled to prevent the compressed air from limiting penetration of the solder 48 into the ends of the capacitor and also causing porosity of the soldered joint formed by the termination 21. Accordingly, it is desirable that the air be removed from the mold cavity 372 before or while the molten solder 48 is injected into the cavity 372 of the mold 371. The mold cavity 372 may be provided with aperture 385 to permit the air, normally confined in the ends 51 of the capacitor 22 and in the mold cavity to escape during the solder injecting operation. However, a vacuum is drawn through a nozzle 390 secured to the mold 371 and mounted slidably on a piston 395 secured to the framework of the apparatus. When the mold 371 and attached nozzle 390 is reciprocated toward the end 51 of the capacitor 22, the nozzle 390 slides on the stationary piston 395 to cause vacuum to be drawn in the nozzle 390 to withdraw at least a part of the air contained in the end 51 of the capacitor 22 and in the mold 371. When the mold 371 and nozzle 390 are retracted from the end of the capacitor 22, the piston 395 causes air to be forced out of the nozzle and aperture 385 in the mold to clean the nozzle and aperture. If additional vacuum is required, the piston 395 may be retracted, by suitable means not shown, after the nozzle 373 and mold 371 is urged against the end of the capacitor 22.

The mold plates may be eliminated and the clamping elements may be modified as illustrated in FIG. 31 to form a two-piece, combined clamping and molding device, designated generally by the numeral 427. The two elements 431—431, only one of which is illustrated, of the combined clamping and molding device 427 have cooperating depressions 476—476 on the adjacent faces thereof to form sprue holes on opposite ends thereof into which the nozzles 73—73 projecting from reciprocating solder chambers 52—52, illustrated in FIG. 1, may be inserted to inject the molten solder 48 into mold cavities, designated generally by the numerals 472—472, formed by cooperating depressions 482 on the faces of the pieces of the combined molding and clamping device 427. Ridges 480—480 projecting from the depressions 472—472 in the elements 431—431 are urged against the capacitor 22 and cooperate to close the adjacent ends of the mold cavities 472—472. The ridges 480—480 are also used to apply radial pressures to the capacitor 22 adjacent to the ends 51—51 thereof to limit the depth of penetration of the molten solder 48 into the ends of the capacitor.

The lead wires 83—83 are guided into the mold cavities 472—472 through apertures 485—485 formed in the ends thereof by the two cooperating elements 431—431. The lead wires 83—83 are guided out of the sides of the mold cavities 472—472 through tapered apertures 490—490 formed by cooperating depressions in the elements 431—431. As a terminated capacitor 22 is fed transversely of the separated elements 431—431 of the combined molding and clamping device 427, successive sections of the lead wires 83—83 are pulled around guide pins 495—495 projecting from the face of one of the elements 431—431 which are designed to fit in apertures in the adjacent face of the other element (not shown). Cutting edges 496—496 may be formed in the restricted end of the portion of the depressions on the elements 431—431 which cooperate to form the guide apertures 490—490. The cutting edges 496—496 may be utilized to cut the lead wires 83—83 extending from a newly terminated capacitor 22 to the mold cavities 472—472 after the capacitor is removed therefrom to eliminate radially projecting leads from being formed and to separate successive terminated capacitors.

Another embodiment of the invention illustrated on FIG. 32 is provided for terminating capacitors 22—22 at a relatively rapid rate without placing leads on the terminated capacitor. A mold, designated generally by the numeral 571, is provided with two cavities 570 and 572 interconnected with a small aperture 574 which is highly restricted at opposite ends 575—575 thereof to reduce the cross-section of interconnecting sections 580—580 of terminations 581—581 to a minimum to facilitate subsequent separation of the terminated capacitors 22. The one cavity 570 is long enough to support the capacitor 22 plus one of the terminations 581—581, and the other cavity 572 is long enough to support the capacitor 22 plus two of the terminators 581—581. The longer cavity 572 has an axial aperture 585 which extends to an end of the mold 571. The aperture 585 is similar in shape to the aperture 574 interconnecting the two cavities 570 and 572 and confines a portion of the section 580 of the solder 48 interconnecting the two terminators 581—581 on adjacent capacitors 22—22 which was formed by the interconnecting aperture 574.

The capacitors 22—22 may be fed through a molding process on a tape, chain, belt or other suitable means (not shown) in spaced end-to-end relationship. The capacitors 22—22 are first fed into the cavity 570 where a termination 581 is molded on the leading end 51 of the particular capacitor 22, and a termination 581 is molded on the trailing end 51 of a proceeding capacitor 22. The two terminations 581 are interconnected with the section 580 of the solder 48 formed by the aperture 574. The capacitor 22 is then fed to the second cavity 572 and positioned so that a portion of the interconnecting section 580 of the solder 48 is positioned in the aperture 585 so that a sprue 590 on the leading end of capacitor 22 in the cavity 572 is in contact with the end of the mold 571. With the capacitor 22 in the second cavity 572, the termination 581 is molded on the trailing end of the capacitor in the second cavity 572 and on the leading end of the capacitor in the first cavity 570. This procedure is then reported as often as desired to terminate successive capacitors. The solder 48 is forced into the mold 571 to form both of the terminations 581—581 from a single nozzle 573 extending vertically upwardly from a stationary solder chamber 552 by applying compressed air to the chamber through a tube 583. The two halves of the mold 571 are pushed together with the capacitors 22—22 therebetween and are reciprocated into and out of molding position on a plurality of guide pins 557—557 by a single piston-cylinder assembly 567 against the action of compression springs 582—582.

The molded electrical terminals produced by this apparatus or the previously described molding apparatus may be in the shape of lugs 601–601 (FIG. 33), molding brackets 602–602 (FIG. 34) or other desired structural shapes facilitating electrical and mechanical connections between the electrical component and other portions of electrical equipment of which the particular component forms a part, without using conventional wire leads. The lugs may extend axially or transversely of the component and may be round, square, spherical, pointed, threaded or any other desirable shape to permit insertion of the terminal in a clip or facilitate interlocking of capacitors or electrical components in series or parallel relationship in an electrical circuit. This affords mechanical as well as electrical connections to be made simultaneously which saves assembly parts and time and increases economy.

The electrical lead on the end of the electrical components need not be made of wire but could be a straight, bent or headed shank embedded in the solder termination with the free end of the shank being bifurcated, threaded, or provided with an eyelet or any other desirably shaped portion to facilitate forming a mechanical connection between the electrical component and portion of electrical equipment of which the component is to become a part.

Various types of lead-tin alloys varying from 100 parts lead and 0 part tin to 5 parts lead and 95 parts tin have been used successfully in practicing the present invention; however, the preferred type of solder consists of 60% lead and 40% tin. Various other types of high melting point alloys such as zinc can definitely be utilized but require more critical control of such parameters as the temperature of the solder, cooling rate and injection rates than is required with the relatively fluid solder consisting of 60 parts lead and 40 parts tin which permits thinner terminations to be formed requiring less material. The term solder as used herein and in the appended claims is not intended to be restricted to metals or metal alloys but is intended to include also other fusible materials used to mend holes or join two or more surfaces such as plastics or conductive plastics.

It should be understood that, even though spirally wound, extended-metalized-Mylar capacitors are described in the preferred embodiment of the invention, folded capacitors, capacitors with any other construction, or components other than capacitors may be terminated by utilizing the principles of the present invention. The terms "interleaved layers of conductive and dielectric materials" as used in the descriptive portion of the specification and in the claims are intended to include capacitors which are wound, folded, or constructed in any suitable manner wherein two or more constructive plates of the capacitor are separated by dielectric material.

It is to be understood that the above-described arrangements are simply illustrative of the principles of the invention. Other arrangements may be devised by those skilled in the art which will embody the principles of the invention and fall within the spirit and scope thereof.

What is claimed is:

1. The method of forming an improved electrical termination on the end of a capacitor formed of interleaved layers of conductive and dielectric materials, which comprises:

supporting a mass of molten solder adjacent to the end of the capacitor, applying pressure transversely of the axis of the capacitor adjacent to the end thereof to confine penetration of molten solder in the end of the capacitor to a desired depth, extruding a portion of the mass of molten solder into interstitial spaces in the end of the capacitor between the interleaved layers of conductive and dielectric materials, and rapidly cooling the portion of the molten solder contacting the capacitor while simultaneously confining at least a portion of the mass of solder remaining exteriorly of the capacitor under pressure to form an electrical termination projecting from the end thereof with a portion of the confined mass of solder.

2. The method of forming an improved electrical termination on the end of a capacitor formed of interleaved layers of conductive and dielectric materials, which comprises:

supporting a mass of molten solder adjacent to the end of the capacitor, removing air from the interstitial spaces between the interleaved layers of conductive and dielectric materials, extruding a portion of the mass of molten solder into the interstitial spaces in the end of the capacitor between the interleaved layers of conductive and dielectric materials, and rapidly cooling the portion of the molten solder contacting the capacitor while simultaneously confining at least a portion of the mass of solder remaining exteriorly of the capacitor under pressure to form an electrical termination projecting from the end thereof with a portion of the confined mass of solder.

3. Apparatus for forming an electrical termination on the end of an electrical capacitor formed of interleaved layers of conductive and dielectric materials, which comprises:

a supply of solder, means for heating at least a portion of the solder to a molten state, die means for confining at least a portion of the molten solder around a portion of the electrical lead and adjacent to the end of a capacitor onto which an electrical termination is to be formed and cooling the molten solder confined therein at a relatively rapid rate, and means for applying pressure on the molten solder confined in the die means to force a portion of the molten solder at a relatively rapid rate into the interstitial spaces between the interleaved layers of conductive and dielectric materials of the capacitor adjacent to the end thereof and for controlling the depth of penetration of the extruded molten solder into said interstitial spaces.

4. Apparatus for securing an electrical lead to the end of an electrical capacitor formed of interleaved layers of conductive and dielectric materials, which comprises:

a supply of solder;

means for heating the solder to a molten state;

die means having a cavity for confining the molten solder around a portion of an electrical lead and adjacent to the end of a capacitor onto which the electrical lead is to be secured, the die means having an aperture therein through which the electrical lead enters the cavity of the die adjacent to the end of the capacitor;

means for applying pressure on the molten solder confined in the cavity of the die means to force the molten solder into the interstitial spaces between the interleaved layers of conductive and dielectric materials of the capacitor adjacent to the end thereof; and clamping means for applying forces traversely of the axis of the capacitor to confine penetration of the molten solder in the end of the capacitor to a desired depth.

5. Apparatus for securing an electrical lead to the end of an electrical capacitor formed of interleaved layers of conductive and dielectric materials, which comprises:

a supply of solder;

means for heating the solder to a molten state;

die means having a cavity for confining the molten solder around a portion of an electrical lead and adjacent to the end of a capacitor onto which the electrical lead is to be secured, the die means having an aperture therein through which the electrical lead enters the cavity of the die adjacent to the end of the capacitor;

means for feeding the electrical lead through the supply of solder to preheat and coat at least a portion of the lead with the molten solder; and means for applying pressure on the molten solder confined in the cavity of the die means to force the molten solder into the interstitial spaces between the interleaved layers of conductive and dielectric materials of the capacitor adjacent to the end thereof.

6. Apparatus for securing an electrical lead to the end of an electrical capacitor formed of interleaved layers of conductive and dielectric materials, which comprises:

means for supporting an electrical lead adjacent to the end of a capacitor, a supply of solder, means for heating at least a portion of the solder to a molten state, die means for confining at least a portion of the molten solder around a portion of the electrical lead and adjacent to the end of a capacitor onto which an electrical lead is to be secured, vacuum means for removing at least a portion of the air confined in the interstitial spaces in the end of the capacitor and in the mold, and means for applying pressure on the molten solder confined in the die means to force a portion of the molten solder into the interstitial spaces between the interleaved layers of conductive and dielectric materials of the capacitor adjacent to the end thereof.

7. Apparatus for securing an electrical lead to the end of an electrical capacitor formed of interleaved layers on conductive and dielectric materials, which comprises:

a supply of solder;

means for heating the solder to a molten state;

die means having a cavity for confining the molten solder around a portion of an electrical lead and adjacent to the end of a capacitor onto which the electrical lead is to be secured, the die means having an aperture therein through which the electrical lead enters the cavity of the die adjacent to the end of the capacitor;

vacuum means for removing at least a portion of the air confined in the end of the capacitor and in the mold and to draw molten solder from the supply of solder into the die cavity; and means for urging the die means with molten solder confined in the cavity thereof against the end of the capacitor to force the molten solder into the interstitial spaces between the interleaved layers of conductive and dielectric materials of the capacitor adjacent to the end thereof.

8. Apparatus for securing electrical leads to a series of capacitors formed of interleaved layers of conductive and dielectric materials, which comprises:

means for feeding successively a series of capacitors;

clamping means for supporting successive capacitors individually in a molding position and for applying pressure adjacent to the ends of the capacitors transversely thereof to confine penetration of molten solder in the ends of the capacitors to a desired depth during molding operations;

a mold on each side of the molding position being mounted for reciprocation toward and away from each other into engagement with associated ends of the capacitors supported in the clamping means, the molds having cavities on adjacent sides thereof designed to receive molten solder and confine the molten solder adjacent to the ends of successive capacitors;

a solder chamber associated with each of the molds having a cavity designed to contain a supply of molten solder for the associated mold;

means for supplying electrically conductive leads and for positioning successive leads adjacent to each of the successive ends of the capacitors;

means for forcing the molds toward and away from each other into and out of engagement with the associated ends of successive capacitors with a controlled pressure; and means for applying pressure to the solder in the chamber to force the molten solder into the cavities of the molds and into the interstitial space between the layers of conductive and dielectric materials with a predetermined force.

9. Apparatus for securing electrical leads to a series of capacitors formed of interleaved layers of conductive and dielectric materials, which comprises:

means for feeding successively a series of capacitors;

clamping means for supporting successive capacitors individually in a molding position and for applying pressure adjacent to the ends of the capacitors transversely thereof to confine penetration of molten solder in the ends of the capacitors to a desired depth during molding operations;

a mold on each side of the path of travel of the capacitors being mounted for reciprocation axially of the capacitors toward and away from each other into engagement with associated ends of the capacitors supported in the clamping means, the molds having cavities on adjacent sides thereof designed to receive molten solder and confine the molten solder adjacent to the ends of the successive capacitors;

a solder chamber associated with each of the molds having a cavity designed to contain a supply of molten solder for the associated mold;

means for supplying electrically conductive lead wires and for guiding the lead wires into the molds adjacent to each of the successive ends of the capacitors;

means for forcing the molds toward and away from each other into and out of engagement with the associated ends of successive capacitors with a controlled pressure;

means for applying pressure to the solder in the chamber to force the molten solder into the cavities of the molds with a predetrmined force; and means for increasing the force with which the molds are urged against the ends of the capacitors subsequent to injection of molten solder into the mold cavities during successive molding operations.

10. Apparatus for securing electrical terminations to a series of capacitors formed of interleaved layers of conductive and dielectric materials, which comprises:

means for feeding successively a series of capacitors;

a mold on each side of the path of travel of the capacitors being mounted for reciprocation transversely of the path of travel of the capacitors and axially of the capacitors toward and away from each other into engagement with associated ends of successive capacitors, the molds having cavities on adjacent sides thereof designed to receive molten solder and confine the molten solder adjacent to the ends of successive capacitors;

a solder chamber associated with each of the molds having a cavity designed to contain a supply of molten solder for the associated mold;

a nozzle projecting from each of the solder chambers through which molten solder is forced into apertures in the associated molds;

means for forcing the molds toward and away from each other into and out of engagement with the associated ends of successive capacitors with a controlled pressure;

means for removing air from the mold cavities and the interstitial spaces between interleaved layers of conductive and dielectric materials and for drawing a portion of the solder in the chamber into the cavities of the molds; and means for increasing the force with which the molds are urged against the ends of the capacitors subsequent to the drawing of the molten solder into the mold cavities during successive molding operations.

11. Apparatus for terminating a series of capacitors formed of interleaved layers of conductive and dielectric materials, which comprises:

means for feeding successively a series of capacitors in end-to-end relationship into a molding position;

a split mold having segments on each side of the path of travel of the capacitors being mounted for reciprocation transversely of the path of travel of the capacitors and toward and away from each other into engagement with associated capacitors, the mold segments having cavities on adjacent sides thereof designed to receive molten solder and confine the molten solder adjacent to the ends of successive capacitors;

a solder chamber associated with the mold having a cavity designed to contain a supply of molten solder for the associated mold;

a nozzle projecting from the solder chamber through which molten solder is forced into an aperture in the mold; and means for applying pressure to the solder in the chamber to force the molten solder into the mold with a predetermined force.

12. Apparatus for securing electrical leads to a series of capacitors formed of interleaved layers of conductive and dielectric materials, which comprises:

means for feeding successively a series of capacitors;

combined clamping and molding means for supporting successive capacitors individually in a molding position and for applying pressure adjacent to the ends of the capacitors transversely thereof to confine penetration of molten solder in the ends of the successive capacitors to a desired depth during molding operations;

a mold on each side of the path of travel of the capacitors being mounted for reciprocation transversely of the path of travel of the capacitors toward and away from each other and having cavities designed to cooperate with the combined clamping and molding means to receive molten solder and confine the molten solder adjacent of the ends of successive capacitors;

solder chambers having cavities designed to contain supplies of molten solder for the mold cavities;

a nozzle projecting from each of the solder chambers through which molten solder is forced into apertures in the associated mold cavities, the nozzles having tips which are designed to be inserted into the apertures of the mold cavities;

means for supplying electrically conductive lead wires and for guiding the lead wires into the mold cavities adjacent to each of the successive ends of the capacitors;

means for mounting the molds slidably with respect to the chambers;

resilient means for urging the molds away from the chambers between molding operations;

means for moving the nozzles projecting from the solder chambers into engagement with the portions of the molds forming the apertures and for forcing the molds toward and away from each other into and out of engagement with the combined clamping and molding means;

means for applying pressure to the solder in the chambers to force the molten solder into the cavities of the molds with a predetermined force;

means for supplying successive sections of filaments of solder to the solder chamber to maintain the supply of the solder in the chamber at a predetermined level; and means for supplying heat to the solder chambers for heating the filaments of solder to a molten state.

13. Apparatus for forming electrical terminations to a series of capacitors formed of interleaved layers of conductive and dielectric materials, which comprises:

means for feeding successively a series of capacitors;

combined clamping and molding means for supporting successive capacitors in a molding position and for applying pressure adjacent to the ends of the capacitors transversely thereof to confine penetration of molten solder in the ends of the capacitors to a desired depth during molding operations;

an element of the combined clamping and molding means on each side of the path of travel of the capacitors being mounted for reciprocation transversely of the path of travel of the capacitors toward and away from each other into engagement with associated capacitors, the combined clamping and molding means having cavities adjacent to the ends of the capacitor designed to receive molten solder and confine the molten solder adjacent to the ends of successive capacitors;

solder chamber means associated with the combined clamping and molding means having at least one cavity designed to contain a supply of molten solder for the last-mentioned means;

at least one nozzle projecting from the solder chamber means through which molten solder is forced into the combined clamping and molding means;

means for applying pressure to the solder in the chamber means to force the molten solder into the mold cavities with a predetermined force and to express the solder into the interstitial spaces between the interleaved layers of conductive and dielectric material; and means for supplying heat to the solder chamber.

14. Apparatus for forming electrical terminations to a series of components, which comprises:

means for feeding successively a series of parallelly disposed components transversely of the axes thereof;

combined clamping and molding means for supporting successive components individually in a molding position;

an element of the combined clamping and molding means on each side of the path of travel of the components being mounted for reciprocation transversely of the path of travel of the components toward and away from each other into engagement with associated components, the combined clamping and molding means having cavities adjacent to the ends of the components designed to receive molten solder and confine the molten solder adjacent to the ends of successive components;

solder chamber means associated with the combined clamping and molding means having at least one cavity designed to contain a supply of molten solder for the last-mentioned means;

at least one nozzle projecting from the solder chamber means through which molten solder is forced into the combined clamping and molding means; and means for applying pressure to the solder in the chamber means to force the molten solder in the mold cavities and into intimate contact with the components with a predetermined force.

15. Apparatus for securing electrical leads to a series of capacitors formed of interleaved layers of conductive and dielectric materials, which comprises:

means for feeding successively a series of parallelly disposed capacitors transversely of the axes thereof;

clamping means for supporting successive capacitors individually in a molding position and for applying pressure adjacent to the ends of the capacitors transversely thereof to confine penetration of molten solder in the ends of the capacitors to a desired depth during molding operations;

a mold on each side of the path of travel of the capacitors being mounted for reciprocation transversely of the path of travel of the capacitors and axialy of the capacitors toward and away from each other into engagement with associated ends of the capacitors supported in the clamping means, the molds having cavities on adjacent sides thereof designed to receive molten solder and confine the molten solder adjacent to the ends of successive capacitors;

a solder chamber associated with each of the molds having a cavity designed to contain a supply of molten solder for the associated mold;

a nozzle projecting from each of the solder chambers through which molten solder is forced into apertures in the associated molds;

means for supplying electrically conductive lead wires and for guiding the lead wires and position successive sections of the lead wires adjacent to each of the successive ends of the capacitors;

means for mounting the molds slidably with respect to the chambers;

means for moving the nozzles projecting from the solder chambers into engagement with the portions of the molds forming the apertures and forcing the molds toward and away from each other into and out of engagement with the associated ends of successive capacitors with a controlled pressure; and means for applying pressure to the solder in the chamber to force the molten solder into the cavities of the molds with a predetermined force and to express molten solder into the interstitial spaces between the layers of conductive and dielectric materials in the ends of the capacitors which solidifies to connect the electrical leads securely to the conductive material of the capacitor.

16. Apparatus for terminating a series of capacitors formed of interleaved layers of conductive and dielectric materials, which comprises:

means for feeding successively a series of capacitors;

clamping means for supporting successive capacitors individually in a molding position and for applying pressure adjacent to the ends of the capacitors transversely thereof to confine penetration of molten solder in the ends of the successive capacitors to a desired depth during molding operations;

a mold on each side of the path of travel of the capacitors being mounted for reciprocation transversely of the path of travel of the capacitors and axially of the capacitors toward and away from each other into engagement with associated ends of the clamping means, the molds having cavities on adjacent sides thereof designed to cooperate with the clamping means to form mold cavities to receive molten solder and confine the molten solder adjacent to the ends of successive capacitors;

a solder chamber associated with each of the molds having a cavity designed to contain a supply of molten solder for the associated mold;

a nozzle projecting from each of the solder chambers through which molten solder is forced into apertures in the associated molds;

means for supplying electrically conductive lead wires and for guiding the lead wires through the solder chambers and into the apertures in molds to preheat and pretin at least a portion of the lead wires and position successive sections of the lead wires adjacent to each of the successive ends of the capacitors;

the nozzle having an extrusion orifice which includes a frustoconically shaped exit and a land which is shorter than the minimum diameter of the die orifice to permit the lead wires to pull the solidified solder out of the exits of the orifices which form fillets around portions of the lead wires and clean the exits of the orifices automatically after each molding operation;

means for mounting the molds slidably with respect to the chambers;

resilient means for urging the molds away from the chambers between molding operations;

means for moving the nozzles projecting from the solder chambers into engagement with the portions of the molds forming the apertures and for forcing the molds toward each other into engagement with the associated ends of the clamping means;

means for removing air from the mold cavities and the interstitial spaces between interleaved layers of conductive and dielectric materials;

means for applying pressure to the solder in the chamber to force the molten solder into the cavities of the molds with a predetermined force;

means for supplying successive sections of filaments of solder to the solder chamber to maintain the supply of the solder in the chamber at a predetermined level; and means for supplying heat to the solder chamber for heating the filaments of solder to a molten state.

17. Apparatus for securing electrical leads to a series of capacitors formed of interleaved layers of conductive and dielectric materials, which comprises:

means for feeding successively a series of parallelly disposed capacitors transversely of the axes thereof;

clamping means for supporting successive capacitors individually in a molding position and for applying pressure adjacent to the ends of the capacitors transversely thereof to confine penetration of molten solder in the ends of the successive capacitors to a desired depth during molding operations;

a mold on each side of the path of travel of the capacitors being mounted for reciprocation transversely of the path of travel of the capacitors and axially of the capacitors toward and away from each other into engagement with associated ends of the capacitors supported in the clamping means, the molds having cavities on adjacent sides thereof designed to receive molten solder and confine the molten solder adjacent to the ends of successive capacitors;

a solder chamber associated with each of the molds having a cavity designed to contain a supply of molten solder for the associated molds;

a nozzle projecting from each of the solder chambers through which molten solder is forced into rounded apertures in the associated molds, the nozzles having rounded tips which are designed to be inserted into the rounded apertures of the molds;

means for supplying electrically conductive lead wires and for guiding the lead wires through the solder chambers and into the apertures of molds to preheat and pretin at least a portion of the lead wires and position successive sections of the lead wires adjacent to each of the successive ends of the capacitors;

the nozzles each having an extrusion orifice which includes a frustoconically shaped exit and a land which is shorter than the minimum diameter of the die orifice to permit the lead wires to pull the solidified solder out of the exits of the orifices which form fillets around portions of the lead wires and clean the exits of the orifices automatically after each molding operation;

means for mounting the molds slidably with respect to the chambers;

resilient means for urging the molds away from the chambers between molding operations;

means for moving the nozzles projecting from the solder chambers into engagement with the portions of the molds forming the apertures and for forcing the molds toward each other into engagement with the associated ends of successive capacitors with a controlled pressure;

means for removing air from the mold cavities and the interstitial spaces between interleaved layers of conductive and dielectric materials;

means for applying pressure to the solder in the chamber to force the molten solder into the cavities of the molds with a predetermined force;

means for increasing the force with which the molds are urged against the ends of the capacitors subsequent to injection of molten solder into the mold cavities during successive molding operations;

means for supplying successive sections of filaments of solder to the solder chambers to maintain the supply of the solder in the chambers at a predetermined level; and means for supplying heat to the solder chamber for heating the filaments of solder to a molten state.

18. Apparatus for securing electrical leads to a series of capacitors formed of interleaved layers of conductive and dielectric materials, which comprises:

means for feeding successively a series of capacitors;

clamping means for supporting successive capacitors individually in a molding position and for applying pressure adjacent to the ends of the capacitors transversely thereof to confine penetration of molten solder in the ends of the capacitors to a desired depth during molding operations;

a mold on each side of the path of travel of the capacitors being mounted for reciprocation transversely of the path of travel of the capacitors and axially of the capacitors toward and away from each other into engagement with associated ends of the capacitors supported in the clamping means, the molds having cavities on adjacent sides thereof designed to receive molten solder and confine the molten solder adjacent to the ends of successive capacitors;

a solder chamber associated with each of the molds having a cavity designed to contain a supply of molten solder for the associated mold;

a nozzle projecting from each of the solder chambers through which molten solder is forced into tapered apertures in the associated molds, the nozzles having complementary shaped tips which are designed to be inserted into the tapered apertures of the molds;

means for supplying electrically conductive lead wires and for guiding the lead wires through the solder chambers and into the apertures in the molds to preheat and pretin at least a portion of the lead wires and position successive sections of the lead wires adjacent to each of the successive ends of the capacitors;

the nozzle having an extrusion orifice which includes a frustoconically shaped exit and a land to permit the lead wires to pull the solidified solder out of the exits of the orifices which form fillets around portions of the lead wires and clean the orifices automatically after each molding operation;

means for mounting the molds slidably with respect to the chambers;

resilient means for urging the molds away from the chambers between molding operations;

means for moving the nozzles projecting from the solder chambers into engagement with the portions of the molds forming the apertures and for forcing the molds toward each other into engagement with the associated ends of successive capacitors with a controlled pressure; and means for applying pressure to the solder in the chamber to force the molten solder into the cavities of the molds with a predetermined force and into the interstitial spaces between the layers of conductive and nonconductive materials to form electrical terminations on the ends of the capacitors in which the leads are embedded.

19. Apparatus for securing electrical leads to a series of capacitors formed of interleaved layers of conductive and dielectric materials, which comprises:

means for feeding successively a series of parallelly disposed capacitors transversely of the axes thereof;

clamping means for supporting successive capacitors individually in a molding position and for applying pressure adjacent to the ends of the capacitors transversely thereof to confine penetration of molten solder in the ends of the capacitors to a desired depth during molding operations;

a mold on each side of the path of travel of the capacitors being mounted for reciprocation transversely of the path of travel of the capacitors and axially of the capacitors toward and away from each other into engagement with associated ends of the capacitors supported in the clamping means, the molds having cavities on adjacent sides thereof designed to receive molten solder and confine the molte nsolder adjacent to the ends of successive capacitors;

a solder chamber associated with each of the molds having a cavity designed to contain a supply of molten solder for the associated mold;

a nozzle projecting from each of the solder chambers through which molten solder is forced into tapered apertures in the associated molds, the nozzles having tapered radius tips which are designed to be inserted into the complementary shaped apertures of the molds;

means for supplying electrically conductive lead wires and for guiding the lead wires through the solder chambers and into the apertures of molds to preheat and pretin at least a portion of the lead wires and position successive sections of the lead wires adjacent to each of the successive ends of the capacitors;

the nozzle having an extrusion orifice which includes a frustoconically shaped exit and a land which is less than the minimum diameter of the die orifice to permit the lead wires to pull the solidified solder out of the exits of the orifices which form fillets around portions of the lead wires and clean the exits of the orifices automatically after each molding operation;

means for mounting the molds slidably with respect to the chambers;

resilient means for urging the molds away from the chambers between molding operations;

means for moving the nozzles projecting from the solder chambers into engagement with the portions of the molds forming the apertures and for forcing the molds toward each other into engagement with the associated ends of successive capacitors with a controlled pressure;

means for removing air from the mold cavities and the interstitial spaces between interleaved layers of conductive and dielectric materials;

means for applying pressure to the solder in the chamber to force the molten solder into the cavities of the molds with a predetermined force;

means for increasing the force with which the molds are urged against the ends of the capacitors subsequent to injection of molten solder into the mold cavities during successive molding operations;

means for supplying successive sections of filaments of solder to the solder chamber to maintain the supply of the solder in the chamber at a predetermined level; and means for supplying heat to the solder chamber for heating the filaments of solder to a molten state and maintaining the solder in the chamber at a predetermined temperature.

References Cited
UNITED STATES PATENTS

| | | | |
|---|---|---|---|
| 2,701,411 | 2/1955 | Paine | 29—155.5 |
| 3,020,625 | 2/1962 | Willis | 29—155.5 |
| 2,503,912 | 4/1950 | Kimball | 317—260 |
| 2,531,185 | 11/1950 | Wurster | 317—260 |
| 3,089,220 | 5/1963 | Nyborg | 29—25.42 |
| 3,068,823 | 12/1962 | Nyborg | 29—503 X |
| 2,869,497 | 1/1959 | Lehner | 29—503 X |
| 2,484,485 | 10/1949 | Brickman. | |
| 1,952,925 | 3/1934 | Kopinski | 29—499 |
| 1,782,447 | 11/1930 | Scrantom | 22—202 |
| 1,711,069 | 4/1929 | Stuckeman | 22—58 |

JOHN F. CAMPBELL, *Primary Examiner.*

J. L. CLINE, *Assistant Examiner.*